United States Patent [19]

Ostendorf et al.

[11] Patent Number: 5,839,105
[45] Date of Patent: Nov. 17, 1998

[54] SPEAKER-INDEPENDENT MODEL GENERATION APPARATUS AND SPEECH RECOGNITION APPARATUS EACH EQUIPPED WITH MEANS FOR SPLITTING STATE HAVING MAXIMUM INCREASE IN LIKELIHOOD

[75] Inventors: Mari Ostendorf, Brookline, Mass.; Harald Singer, Kyoto, Japan

[73] Assignee: ATR Interpreting Telecommunications Research Laboratories, Kyoto, Japan

[21] Appl. No.: 758,378

[22] Filed: Nov. 29, 1996

[30] Foreign Application Priority Data

Nov. 30, 1995 [JP] Japan ..................................... 7-312286

[51] Int. Cl.$^6$ ...................................................... G10L 7/02
[52] U.S. Cl. ........................................... 704/256; 704/231
[58] Field of Search ..................................... 704/255, 256, 704/257, 244, 245, 231

[56] References Cited

PUBLICATIONS

Sagayama et al., *ATREUS: a Speech Recognition Front–end for a Speech Translation System*, Proceedings of European Conference on Speech Communication and Technology, (1993), pp. 1287–1290.

Kosaka et al., Tree–Structured Speaker Clustering for Speaker–Independent Continuous . . . , ICSLP, (1994), pp. 1375–1378.

Takami et al., *Automatic Generation of Speaker–Common Hidden. . .* Proceedings of Acoustic Society in Japan (partial English translation), (1992), pp. 155–156.

Bahl et al. *Decision Trees for Phonological Rules in Continuous Speech*, IEEE Proceedings of the International Conference on Acoustic Speech and Signal Processing, (1991), pp. 185–188.

Lee et al., *Allophone Clustering For Continuous Speech Recognition*, IEEE Proceedings of the International Conference on Acoustic Speech and Signal Processing, (1990), pp. 749–752.

Huang et al., *An Overview of the SPHINX–II Speech Recognition System*, Proceedings of ARPA Workshop on Human Language Technology, pp. 81–86.

Kannan et al., *Maximum Likelihood Clustering of Gaussians for Speech Recognition*, IEEE Transactions on Speech and Audio Processing, vol. 2, No. 3, (1994), pp. 453–455.

Young et al., *Tree–Based State Tying for High Accuracy Acoustic Modelling*, pp. 286–291.

Bahl et al., *Context Dependent Vector Quantization for Continuous Speech Recognition*, IEEE Proceedings of the International Conference on Acoustic Speech and Signal Processing, (1993), pp. II–632–II–635.

(List continued on next page.)

*Primary Examiner*—David R. Hudspeth
*Assistant Examiner*—Harold Zintel

[57] ABSTRACT

There is provided a speaker-independent model generation apparatus and a speech recognition apparatus which require a processing unit to have less memory capacity and which allow its computation time to be reduced, as compared with a conventional counterpart. A single Gaussian HMM is generated with a Baum-Welch training algorithm based on spoken speech data from a plurality of specific speakers. A state having a maximum increase in likelihood as a result of splitting one state in contextual or temporal domains is searched. Then, the state having a maximum increase in likelihood is split in a contextual or temporal domain corresponding to the maximum increase in likelihood. Thereafter, a single Gaussian HMM is generated with the Baum-Welch training algorithm, and these steps are iterated until the states within the single Gaussian HMM can no longer be split or until a predetermined number of splits is reached. Thus, a speaker-independent HMM is generated. Also, speech is recognized with reference to the generated speaker-independent HMM.

10 Claims, 9 Drawing Sheets

OTHER PUBLICATIONS

Dempster et al., *Maximum Likelihood from Incomplete Data* . . . , Royal Statistical Society, Journal, Series B. vol. 39, No. 1, (1977), pp. 1–38.

Anderson, *An Introduction To Multivariate Statistical Analysis,* 2nd Ed., John Wiley & Sons, (1984), pp. 404–411.

Breiman et al., *Classification And Regression Trees,* Wadsworth, Inc., (1984), pp. 266–271.

Bahl et al., *A Tree–Based Statistical Language Model* . . . , IEEE Transactions on Acoustic Speech and Signal Processing, vol. 37, No. 7, (1989), pp. 507–514.

Chou, *Optimal Partitioning for Classification And Regression Trees,* IEEE Transactions On Pattern Analysis and Machine Intelligence, vol. 13, No. 4, Apr. 1991, pp. 340–354.

Linde et al., *An Algorithm for Vector Quantizer Design,* IEEE Transactions On Communications, vol. COM–28, No. 1, Jan. 1980, pp. 84–95.

Nadas et al., *An Iterative "Flip–Flop" Approximation Of the Most Informative* . . . , IEEE Proceedings of the International Conference on Acoustic Speech and Signal Processing, (1991), pp. 565–568.

Kurematsu et al., *ATR Japanese Speech Database As A Tool Of Speech* . . . , Speech Communication 9, Elsevier Science Publishers B.V. (North–Holland), (1990), pp. 367–363.

Singer et al., *Speech Recognition Without Grammar Or Vocabulary Constrains,* ICSLP, (1994), pp. 2207–2210.

Takami et al., *A Successive State Splitting Algorithm for Efficient Allophone Modelling,* IEEE, (1992), pp. I–573–I–576.

Nagai et al., *The SSS–LR Continuous Speech Recognition System* . . . , Proceedings of International Conference on Spoken Language Processing, (1992), pp. 1511–1514.

Nagai et al., *Atreus: A Comparative Study of Continuous Speech* . . . , 1993 IEEE ICASSP–93 reprint, pp. II–139–II–142.

Fig. 2

Speaker Model Generation Process by SI - SSS Method

S11 — Generate Single Gaussian HM - net Using Baum - Welch Training Algorithm based on Spoken Speech Data from a Plurality of Specific Speakers.

S12 — Obtain Split Information of Splittable States on All the States within the Generated HM - net. This Process is carried out in a Manner Similar to That of Step S15.

S13 — Search the State to Split having the Maximum Increase in Likelihood based on the Split Information, and Split the Searched State According to the Split Information.

S14 — Search and Determine Affected States Resulting from the Split, and Generate Single Gaussian HM - net by Using Baum - Welch Training Algorithm on these Affected States.

S15 — Search and Determine the Best Split Domain and Phonetic Factor of Future Split on these Two Split States and Affected States, by Using the Maximum Likelihood Split Setting Process, to Obtain Split Information, in which Execute (K) Contextual Split Tests and One Temporal Split Test on K Affected States.

S16 — Unsplittable? Or Predetermined Number of Splits ? — NO / YES

S17 — Store the Obtained HM - net 11 in Memory.

End

Fig.4A PRIOR ART

Original HM - net

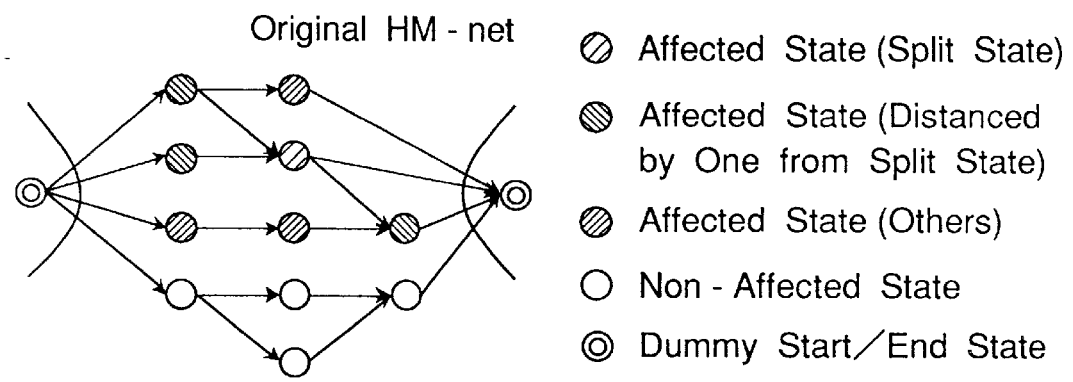

- ⊘ Affected State (Split State)
- ◍ Affected State (Distanced by One from Split State)
- ◐ Affected State (Others)
- ○ Non - Affected State
- ◎ Dummy Start/End State

Fig.4B PRIOR ART

Contextual Split

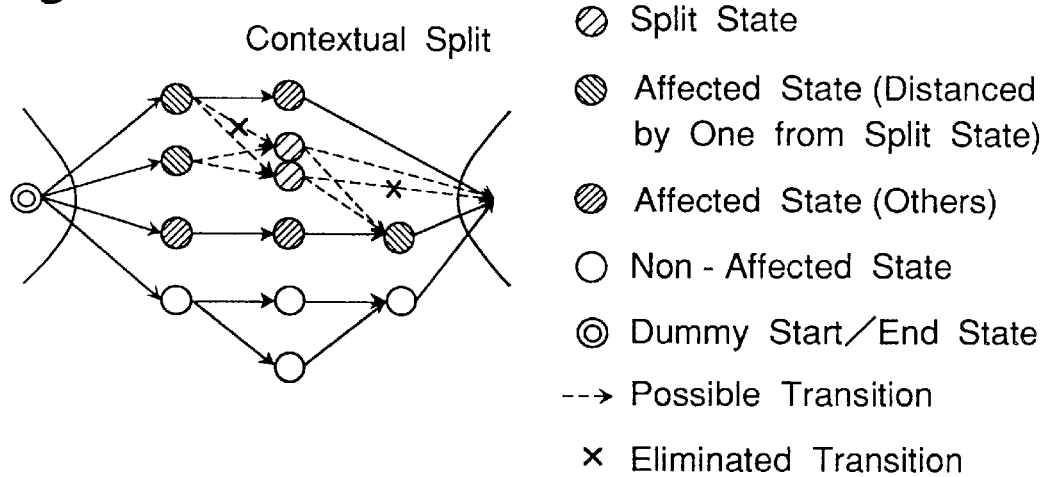

- ⊘ Split State
- ◍ Affected State (Distanced by One from Split State)
- ◐ Affected State (Others)
- ○ Non - Affected State
- ◎ Dummy Start/End State
- --→ Possible Transition
- × Eliminated Transition

Fig.4C PRIOR ART

Temporal Split

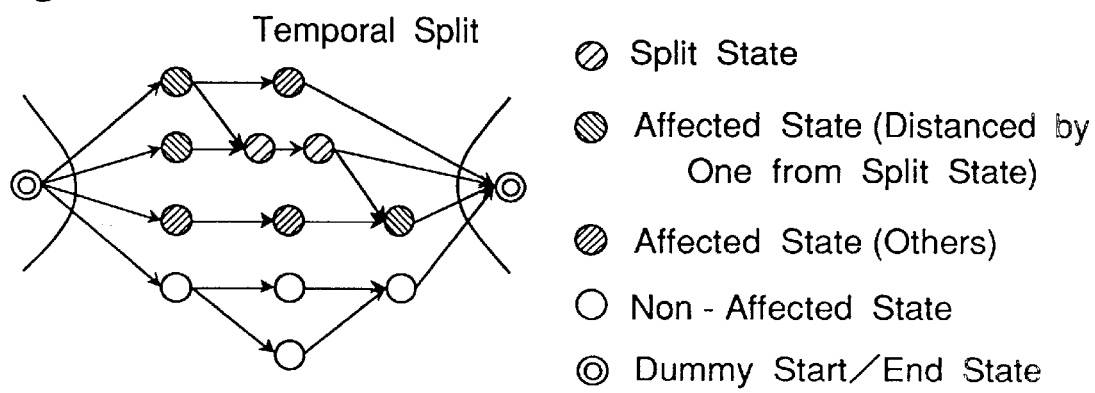

- ⊘ Split State
- ◍ Affected State (Distanced by One from Split State)
- ◐ Affected State (Others)
- ○ Non - Affected State
- ◎ Dummy Start/End State Structure of HM-net Structure of Allophone Model
Represented by HM-net

SPEAKER-INDEPENDENT MODEL GENERATION APPARATUS AND SPEECH RECOGNITION APPARATUS EACH EQUIPPED WITH MEANS FOR SPLITTING STATE HAVING MAXIMUM INCREASE IN LIKELIHOOD

BACKGROUND OF THE INVENTION

1. Field of the Invention

The present invention relates to a speaker-independent model generation apparatus and a speech recognition apparatus, and in particular, to a speaker-independent model generation apparatus for generating a. speaker-independent hidden Markov model (hereinafter, referred to as an HMM) based on spoken speech data from a plurality of specific speakers with means for splitting a state having a maximum increase in likelihood when splitting the same state in context or temporal domains, as well as a speech recognition apparatus for recognizing speech with reference to an HMM of a non-specific speaker based on an input speech signal of a spoken speech sentence.

2. Description of the Prior Art

For example, a prior art document 1, J. Takami et al., "A successive state splitting algorithm for efficient allophone modeling", Proceedings of the International Conference on Acoustic Speech and Signal Processing, Vol. I, pp. 573–576, 1992, discloses an HMM design technique using the successive state splitting approach (hereinafter, referred to as an SSS method), which is an example of the prior art. The SSS method is a powerful technique for HMM design that provides a mechanism for automatically learning or training the most appropriate HMM topology. The basic idea behind the prior art SSS method is that a network of HMM states (hereinafter, referred to as an HM-net) can be increased in size by choosing to split the state with the most variability for the splitting of an HMM state, and then picking the best splitting domain for that state. The iterative application of this splitting results in an HM-net that efficiently represents context and temporal variability of predetermined subword units (for example, phones or moras) smaller than specific words. The SSS method has been used successfully and shown to outperform other HMM design techniques in several studies the present inventor made (for example, See (a) a prior art document 2, A. Nagai et al., "The SSS approach—LR Continuous Speech Recognition System: Integrating SSS-Derived Allophone Models and a Phoneme-Context-Dependent LR Parser", Proceedings of International Conference on Spoken Language Processing, pp. 1511–1514, 1992;

(b) a prior art document 3, A. Nagai et al., "ATREUS: A comparative Study of Continuous Speech Recognition Systems at ATR", Proceedings of the International Conference on Acoustic Speech and Signal Processing, Vol. II, pp. 139–142, 1993; and (c) a prior art document 4, S. Sagayama et al., ATREUS: a Speech Recognition Front-end for a Speech Translation System, Proceedings of European Conference on Speech Communication and Technology, pp. 1287–1290, 1993).

A disadvantage of the SSS method, as it is currently implemented, is that it only works well for training topologies on speaker-dependent data. In the speaker-independent training, the state with the most variability, which would be chosen by the SSS method, is likely to reflect speaker variability rather than coarticulation or temporal effects. In order to use the SSS method for building a speaker-independent model, one first designs a speaker-dependent topology and then retrains this model on speaker-independent data, as disclosed in a prior art document 5, T. Kosaka et al., "Tree-Structured Speaker Clustering for Speaker-Independent Continuous Speech Recognition", Proceedings of the International Conference on Spoken Language Processing, pp. 1375–1378, 1994. Although this solution works well in experiments with carefully read speech by professional speakers (for example, See a prior art document 6, J. Takami et al., "Automatic, Generation of Speaker-Common Hidden Markov Network by Adding the Speaker Splitting Domain to the Successive State Splitting Algorithm", Proceedings of Acoustic Society in Japan, pp. 155–156, 1992), it is likely that it will be a limiting factor in S recognition under less controlled conditions. For spontaneous speech, in particular, the optimal topology for one speaker may not be a good choice for another speaker with a different accent, speaking rate or style.

A technique similar to the SSS method used in many HMM speech recognition systems is divisive distribution clustering, sometimes referred to as decision, tree context modeling. Divisive clustering of distributions using decision tree design techniques was first proposed for whole phone model clustering in (a) a prior art document 7, L. R. Bahl et al., "Decision trees for phonological rules in continuous speech", in Proceedings of the International Conference on Acoustic Speech and Signal Processing, pp. 185–188, 1991; and (b) a prior art document 8, K. F. Lee et al., "Allophone Clustering for Continuous Speech Recognition", Proceedings of the International Conference on Acoustic Speech and Signal Processing, pp. 749–752, in April 1990, and later extended to state-level clustering for tied mixtures (for example, See a prior art document 9, X. Huang et al., "Art overview of the SPHINX-II speech recognition system", Proceedings of ARPA Workshop on Human Language Technology, pp. 81–86, 1993), and single Gaussians (for example, See (a) a prior art document 10, A. Kannan et al., "Maximum Likelihood Clustering of Gaussians for Speech Recognition", IEEE Transactions on Speech and Audio Processing, Vol. 2, No. 3, pp. 453–455, 1994);

(b) a prior art document 11, S. J. Young et al., "Tree-based state tying for high accuracy acoustic modeling", in Proceedings of ARPA Workshop on Human Language Technology, pp. 307–312, 1994; and (c) a prior art document 12, L. Bahl et al., "Context-dependent vector quantization for continuous speech recognition", Proceedings of the International Conference on Acoustic Speech and Signal Processing, Vol. II, pp. 632–635, 1993).

All these approaches used either Viterbi or forward-backward algorithm to associate training observation data with states given some pre-specified HMM topology, followed by decision tree growing of contextual splits under some objective function related to maximum likelihood of the training data. Unlike the SSS method, decision tree context modeling has been successfully used in speaker-independent HMM training. An important difference between the decision tree and the SSS method approaches is that the choice of which distribution to split in decision tree modeling is based on a specific contextual split rather than on the generic measure of state distribution variance used in the SSS method.

ADDITIONAL OBSERVATIONS ON THE SSS METHOD

As stated in better detail in Section 4 of the Detailed Description, the prior art SSS method can benefit from advances in addressing an analogous problem (that is, decision tree design (see prior art document 15, L. Breiman et al., "Classification and Regression Trees", Wadsworth International Group, 1984)). In decision tree design, the problem is to design a function Y=f(X) to predict Y from vector X. If Y takes on values y∈$R^M$ then the function is usually called a regression tree, and if y∈{1, . . . , M} it is called a classification tree. Rather than predicting Y directly, the decision tree function f can also be uses instead to estimate a probability distribution p(y|x)=p(y|f(x)), as in the tree language model used in speech recognition (see prior art document 16, L. Bahl et al., "A tree-based statistical language model for natural language speech recognition", IEEE Transactions on Acoustic Speech, and Signal Processing, Vol. 37, No. 7, pp. 1001–1008, 1989). The distribution estimate interpretation corresponds to the use of divisive distribution clustering in speech recognition (for example, see the prior art documents 10 and 11), and so decision tree design methodology applies here.

In decision tree design, the typical approach is a greedy growing algorithm, that successively grows the tree taking the split which most improves the objective function at each step. This algorithm requires testing all possible current leaves of the tree, all possible variables X (an element of vector X), and all possible ways to split on variable X. Since choosing the best split for variable X is the most frequently called routine, it is important that it be relatively fast. For the case where discrete variable X has J values, there are roughly $2^{J-1}$ possible binary splits to test, which is prohibitively expensive. Breiman et al. in prior art document 15 give a fast solution for the case where M=2. Later, in prior art document 17, P. A. Chou, "Optimal partitioning for classification and regression trees", IEEE Transactions on Pattern Analysis and Machine Intelligence, Vol. 13, No. 4, pp. 340–354, in April, 1991, Chou provides an algorithm for fast split design for the more general case where J≧2 and M ≧2. Although Chou's algorithm is only locally optimal for many tree design objective functions, it is linear in M and J and therefore exponential in one or the other of those parameters when M>2. It is much more efficient than the previously proposed CART algorithm (see the prior art document 15). In the HM-net design problem, using phone models for example, the vector X is comprised of categorical (unconditional) variables that are the possible splitting domains (for example, temporal, or left, right or center phonetic context). For any one of the context domains, the values that X takes on are the phone labels (N=26 phones in Japanese). Thus, the HM-net problem of state splitting is analogous to decision tree categorical question design and can benefit from an algorithm for efficient search of possible splits.

As further discussed toward the end of Subsection 4.1, Chou is also relevant for his use of a variety of loss functions including, for example, the weighted squared error for regression (y∈$R^M$) and the weighted Gini index and log likelihood for classifications. It should be noted that additional insight into prior art documents, and how the present invention advances the state of the art, appears in the Detailed Description; attention is therefore directed to subsequent portions of this disclosure.

As described above, the SSS algorithm is an iterative algorithm that progressively grows the HM-net shown in FIG. 10. The following items of information are assigned to each of the states of the HM-net:

(1) State number;
(2) Acceptable allophone category (defined as a Cartesian product space of phonetic environment factors);
(3) List of antecedent states and succeeding states;
(4) Parameters of output probability distribution; and
(5) Self-transition probability and succeeding-state transition probability.

If some phone sample and its phonetic environment information is given to this HM-net, one path that connects states in which the phonetic environment is acceptable, and which can be uniquely determined according to the constraints of preceding and succeeding state lists. The states, if connected along this path, result in a model equivalent to an HMM as shown in FIG. 11. Therefore, after the path choice, the algorithm for output likelihood computation or model parameter estimation may be used, as it is, like ordinary HMMs.

In the SSS method of the prior art example, as shown in FIG. 12, first of all, a state is selected to be split according to which has the largest divergence between its two mixtures, and then splits in the contextual (or phone-environmental) and temporal domains are tested. FIGS. 4A, 4B and 4C illustrate topology changes, showing how a selected state would be split into two states in the contextual domain and the temporal domain.

A flow chart showing a speaker model generation process using the prior art SSS method is shown in FIG. 13. Referring to FIG. 13, first of all, at step S1, an HM-net of a mixed Gaussian distribution with two mixtures is generated using a known Baum-Welch training algorithm based on spoken speech data from a plurality of specific speakers. Next, at step S2, a state to be split having the largest variability is searched and determined. Then, at step S3, a contextual split test and two temporal split tests are executed on the determined state to be split, by which the best domain for splitting the state is determined. Further, at step S4, affected states are searched and determined, and K context clusterings are executed on the K affected states, by which new initial mixture distribution parameters are computed for each of the affected states. Next, at step S5, an HM-net with 2 Gaussian mixture distributions per state is generated by running the Baum-Welch training algorithm on the affected states. Then, at step S6, it is decided whether or not each state is unsplittable or whether or not the predetermined number of splits (hereinafter, referred to as a predetermined number of splits) has been reached. If the predetermined number of splits has not been reached, the program flow returns to step S2 and iterates the above process. If the state is unsplittable or if the predetermined number of splits has been reached, the HM-net obtained is stored in a memory at step S7.

The term "affected states" includes all states that might have parameters change at the next step S5 because of this split, given that phone boundaries are fixed. Phone boundaries can be given either by hand-marked labels or by a Viterbi alignment. More specifically, the affected states are all states in the subnetwork of a plurality of states connected to the current state to be split after the network has been cut at the dummy beginning and end nodes, as illustrated in FIGS. 4A, 4B and 4C. By this definition, nearly all states are affected by every split, until more specific phone-dependent subnetworks start to evolve. It is to be noted that, for a contextual split, some new paths between states may be impossible because of a mismatch in contextual dependence, and these paths are pruned, as illustrated in FIG. 4B. with "x" indicating the path "pruning".

The key problem of the prior art SSS algorithm is that the best state to split is chosen before the actual split domain, factor and elements are chosen. The output distribution for each state is a mixture of two Gaussian Distributions, and the "best" state is that which has the largest degree of separation between the two mixture components. However, these mixture components are generic and do not necessarily correspond to an allowable split, and so the best state to split by this criterion may not in fact be the best choice given the constraints on allowable splits. In speaker-independent HMM training, for example, the mixture components might be well separated because of speaker differences, but this variability cannot be modeled by adding a new state if the allowable splits are in terms of phonetic context or temporal structure. By choosing the state to split separately from the split itself, we also lose the guarantee of non-decreasing likelihood, although in practice it would be rare to see a decrease in likelihood.

SUMMARY OF THE INVENTION

An essential object of the present invention is therefore to provide a speaker-independent model generation apparatus capable of reducing the computation time of the processing unit for training, as compared with the prior art.

Another object of the present invention is to provide a speech recognition apparatus capable of recognizing speech with reference to a generated speaker-independent model so as to improve the speech recognition rate, as compared with the prior art.

A further object of the present invention is therefore to provide a method for generating a speaker-independent model, capable of reducing the computation time of the processing unit for training, as compared with the prior art.

In order to achieve the aforementioned objective, according to one aspect of the present invention, there is provided a speaker-independent model generation apparatus comprising:

model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution.

In the above-mentioned speaker-independent model generation apparatus, said model generation means preferably comprises:

initial model generation means for generating an initial hidden Markov model of a single Gaussian distribution using the Baum-Welch training algorithm based on spoken speech data from a plurality of specific speakers;

search means for searching a state having a maximum increase in likelihood upon splitting one state in contextual or temporal domains on the initial hidden Markov model of the single Gaussian distribution generated by said initial model generation means;

generation means for splitting the state having the maximum increase in likelihood searched by said search means, in a contextual or temporal domain corresponding to the maximum increase in likelihood and thereafter for generating a hidden Markov model of a single Gaussian distribution using the Baum-Welch training algorithm; and control means for generating a speaker-independent hidden Markov model by iterating a process of said search means and a process of said generation means until at least one of the following conditions is satisfied:

(a) the states within the hidden Markov model of the single Gaussian distribution can no longer be split; and (b) a number of states within the hidden Markov model of the single Gaussian distribution reaches a predetermined number of splits.

According to another aspect of the present invention, there is provided a speech recognition apparatus comprising:

model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution; and speech recognition means for, in response to an input speech signal of a spoken speech, recognizing the spoken speech with reference to the speaker-independent hidden Markov model generated by said model generation means.

It may be useful to point out the main differences relative to prior art, which are:

1. Unlike the prior art SSS method, the SI-SSS method of the present invention uses a joint split design and best state search under an ML criterion, and 2. Unlike decision tree clustering, the SI-SSS method of the present invention provides a mechanism for splitting states temporally in addition to contextually.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a flow chart showing a speaker model generation process of an SI-SSS method which is executed by a speaker-independent model generator 31 of FIG. 1;

FIGS. 4A, 4B and 4C are state transition diagrams, wherein FIG. 4A shows an original HM-net, FIG. 4B shows an HM-net showing contextual splits, and FIG. 4C shows an HM-net showing temporal splits;

DETAILED DESCRIPTION OF THE PREFERRED EMBODIMENTS

Preferred embodiments according to the present invention will be described below with reference to the attached drawings.

1. Features of Present Preferred Embodiment

Figure 1:
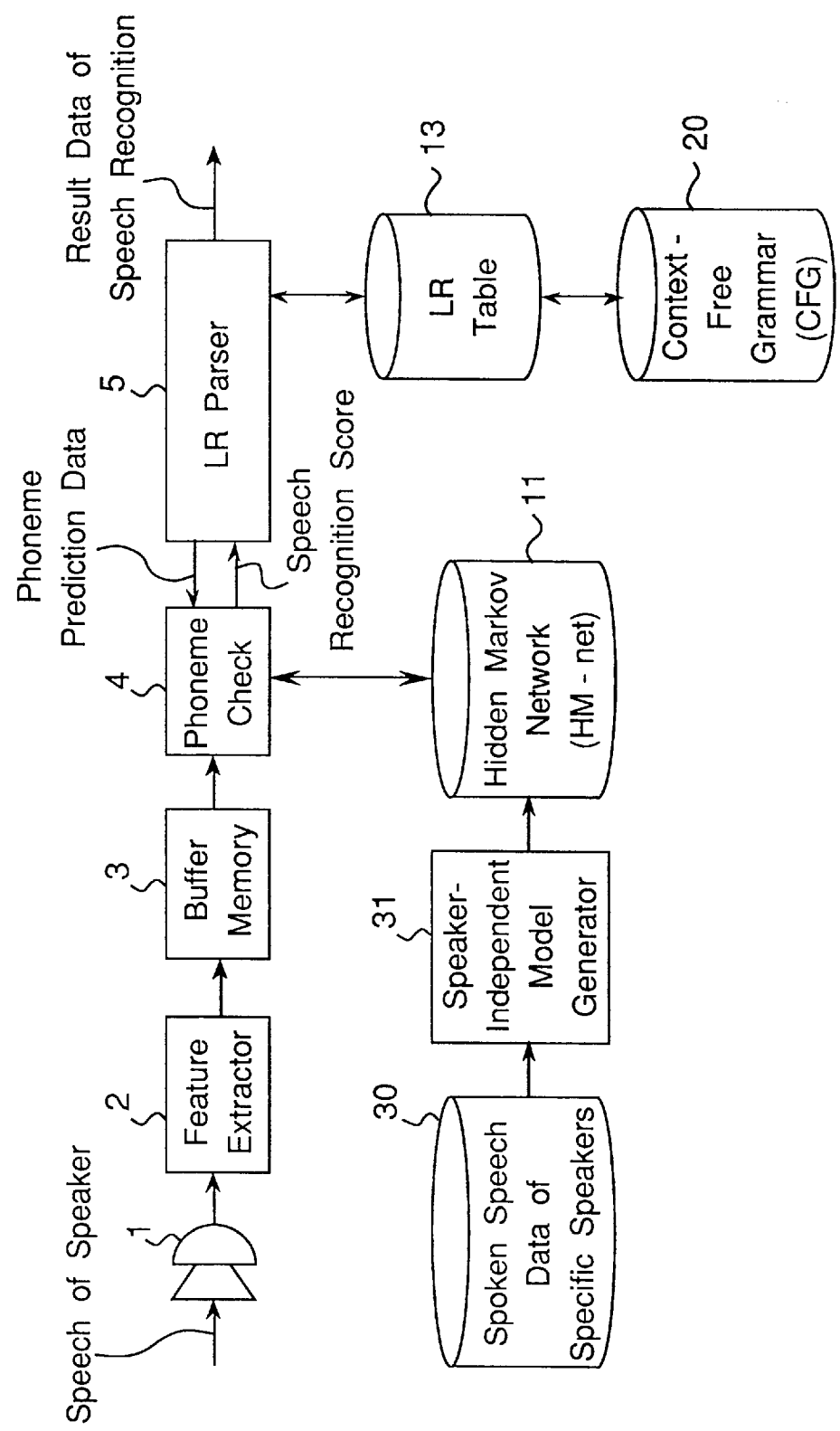
FIG. 1 is a block diagram of a speech recognition apparatus which is a preferred embodiment of the present invention.

FIG. 1 is a block diagram of a speaker-independent continuous speech recognition apparatus which is a preferred embodiment according to the present invention. The speech recognition apparatus of the present preferred embodiment is equipped with, in particular, a speaker-independent model generator 31 for generating a speaker-independent HM-net 11 of non-specific speakers, using a speaker-independent SSS method (hereinafter, referred to as an SI-SSS method) which is an improvement of the prior art SSS method, based on spoken speech data from a plurality N of specific speakers which is stored in a specific-speaker spoken speech data memory 30 and for storing the generated HM-net 11 into the memory 30, and then the speech recognition apparatus performs speech recognition with reference to the HM-net 11. This speech recognition apparatus comprises a microphone 1, a feature extractor 2, a buffer memory 3, a phoneme checker 4, and a phoneme-context-dependent type LR parser (hereinafter, referred to as an LR parser) 5 for executing speech recognition processes with reference to an LR table 13 generated based on a specified context-free grammar within a context-free grammar database 20.

2. Speaker-Independent Model Generation Process of SI-SSS Method

FIG. 2 is a flow chart showing a speaker-independent model generation process which is executed by the speaker-independent model generator 31. Here, we propose a solution to the "speaker-independent HM-net topology training problem", which is different from the prior art SSS method. That is, the solution is simply to reorder the steps of finding the best split for a state and picking the best state to split. The new algorithm, which we will refer to here as the SI-SSS method to distinguish it from the SSS method, is explained below with reference to FIG. 2.

Referring to FIG. 2, at step S11, specified speech feature parameters, which will be each described later, are extracted based on spoken speech data (actually, feature parameter data of spoken speech) 30 of a plurality of specific speakers, and then intervals corresponding to phoneme labels are segmented, and further an initial HM-net of a single Gaussian distribution for a plurality of specific speakers is generated by the conventional method. Then, based on the generated HM-net, training is carried out using the known Baum-Welch training algorithm to generate an HM-net of a single Gaussian distribution. Next, at step S12, split information of splittable states on all the states within the HM-net is obtained. This process is carried out in the same way as that at step S15. That is, the best split domain and phonetic factor of future split on all the states are searched and determined, by using the maximum likelihood split setting process, which will be detailed later, and the results are stored in a memory as split information. The split information refers to the following items of information:

(1) Amount of increase in the expected likelihood as a result of the split;

(2) Whether the split is contextual or temporal; and (3) A set of preceding phonemes, the set of pertinent center phonemes and a set of succeeding phonemes in the contextual domain.

Next, at step S13, the state to split having the largest increase in likelihood is searched based on the split information, and the searched state is split according to the split information. That is, the state to split having a maximum likelihood is split in the best domain (either contextual or temporal domain). Further, at: step S14, affected states resulting from the split are searched and determined, and training is carried out on these affected states using the known Baum-Welch training algorithm to generate an HM-net of a single Gaussian distribution. Then, at step S15, the best split domain and phonetic factor (or phoneme label) of future splits are searched and determined for the two states split at step S13 and the affected states, by using the maximum likelihood split setting process, which will be detailed. later, and the results are stored in a memory as split information. Here, K contextual split tests and one temporal split test are executed on K affected states. At step S16, it is decided whether or not the state in the HM-net of the single Gaussian distribution is unsplittable, or whether or not the number of states within the HM-net of a single Gaussian distribution has reached a pre-predetermined number of splits (hereinafter, referred to as a predetermined number of splits). If the state is splittable and the predetermined number of splits has not been reached, then the program flow returns to step S13 and iterates the above-mentioned process. If the state is unsplittable or if the predetermined number of splits has been reached at step S16, then the HM-net 11 obtained is stored in a memory at step S17.

Figure 12:
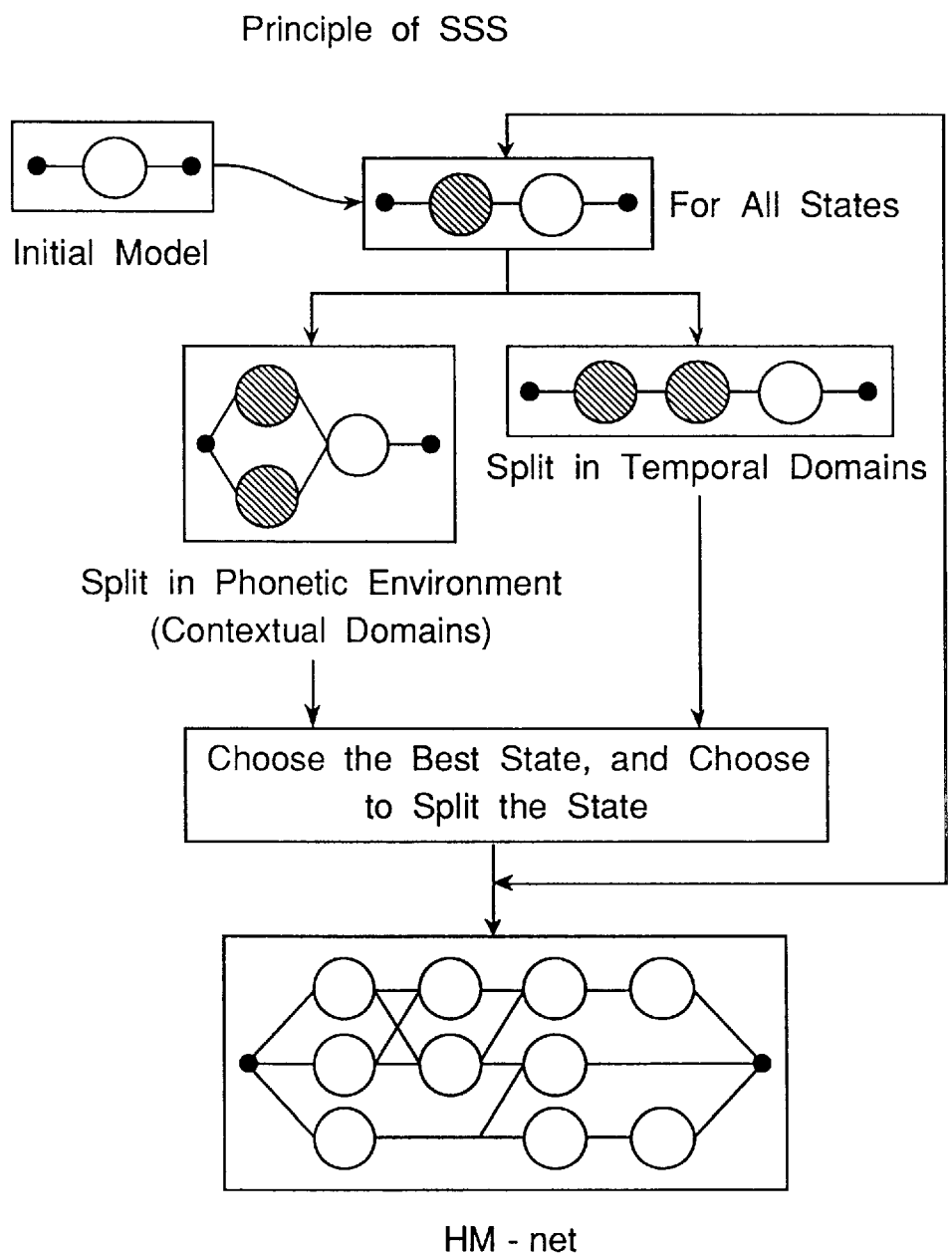
FIG. 12 is a diagram showing a principle of a speaker model generation process of a SSS method of a prior art example.
Figure 13:
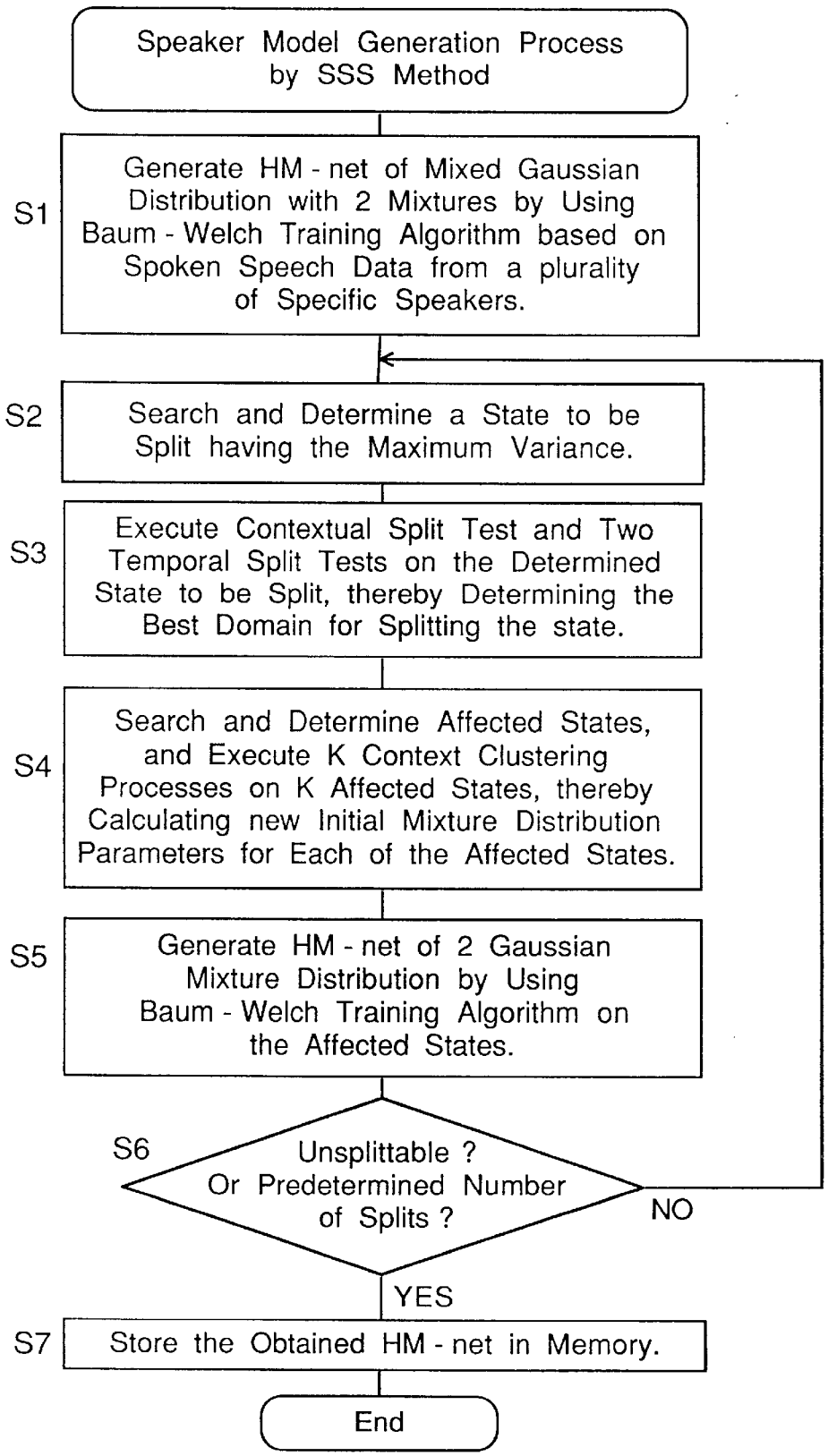
FIG. 13 is a flow chart showing the speaker model generation process of the SSS method shown in FIG. 12.

Step S4 of FIG. 12 in the SSS algorithm for computing the initial mixture parameters for the new states is very similar to the step of finding the best split of phonetic context. Initialization involves a VQ design (Vector Quantization) training procedure to be operated on sample means for different contexts, which is similar to the partitioning algorithm which will be detailed later. By modifying this step slightly and saving the gain from the best split for later testing, we can effectively eliminate step S3 of FIG. 12 and at the same time have a more accurate search. A further advantageous effect of the SI-SSS algorithm of the present preferred embodiment is that Baum-Welch training is on single Gaussian distributions, which runs much faster than training on Gaussian mixtures.

Although the Baum-Welch training step will be much faster in the SI-SSS algorithm than in the SSS algorithm, we expect the computational cost of the two approaches will be the same order of magnitude. If all the affected states are updated, then the number of contextual split tests in both algorithms is essentially the same. That is, assuming K affected states, the number of contextual split tests is K+1 for the SSS method vs. K for the SI-SSS method. The SI-SSS method contextual split test will be somewhat more expensive than the mixture initialization step in the prior art SSS method, since a maximum likelihood clustering criterion is used rather than minimum distance. However, the difference is only a slight one, and this step is a relatively small part of the overall SSS method computation. The SI-SSS method temporal split in the present preferred embodiment will also be more costly, as detailed later, requiring the training of the Baum-Welch training algorithm for the two Gaussian distributions resulting from the state to be split rather than the single forward algorithm pass used in the SSS method temporal split. In addition, there will be potentially K SI-SSS method temporal split tests rather than two SSS method temporal split tests. However, the cost of the temporal splits is a very small part of the overall algorithm, since the amount of data to process with the forward algorithm is small, only that which maps to a single state, and since temporal splits are eventually disallowed by maximum state length constraints. Therefore, the additional cost of the temporal splits of the SI-SSS method should not be problematic. In fact, as detailed later, the SI-SSS method is shown to be faster than the SSS method for speaker-dependent training on 2620 isolated words, according to the experiments made by the present inventor.

Even if the computation time of the SI-SSS method is similar to or slightly faster than the SSS method, it may still be of interest to reduce the HM-net design cost. For both the SSS method and the SI-SSS method, the cost could be reduced by only re-initializing parameters (for the SSS method) or only re-evaluating the best split (for the SI-SSS method) for a subset of the affected states. For example, one might designate the following three levels of affected state:

(A) The two new states generated by the splits;
(B) All states immediately adjacent to these two new states, that is, the states distanced one from the split two new states; and
(C) all other affected states.

In other words, the states that are the targets at step S15 of FIG. 2 may be only the set (A), or only the sets (A) and (B), or all the sets (A), (B) and (C).

In the SI-SSS method, it may be reasonable to re-estimate fewer parameters of the splits for the set (C) states, assuming that the split will change minimally. The possible SI-SSS method options, in order to increase use of the computation, include the followings:

(1) Keep the same split and update only the means and variances of the split to find the new gain;
(2) Keep the split domain (for example, left: context), but re-evaluate the best partitioning of contexts in that domain, initializing the partitioning algorithm with the previous context for faster convergence; and
(3) Re-evaluate the state entirely.

It is to be noted that the two new states must be evaluated for all possible splits, and that it is only the other affected states that one might not want to reevaluate entirely. If the affected states are completely re-evaluated, then the improved SI-SSS algorithm of the present preferred embodiment is guaranteed to give larger increases in the likelihood of the training data than the prior art SSS algorithm starting from the same HMM model. In practice, however, good results may be achieved without complete re-evaluation and with a significantly lower cost.

3. State Splitting and Constrained ML Estimation

There are three possible general objective functions related to maximum likelihood that one might use in split design. The simplest approach, as demonstrated in several other studies (See the prior art documents 9, 10 and 12), is to align the training data to states in some pre-specified topology and then cluster the resulting state distributions to maximize the joint likelihood of the data and the given state sequence. This approach is essentially Viterbi-style training, which has been used successfully in many applications but is known to be sub-optimal relative to Baum-Welch training.

A second option is to maximize likelihood of the observation data directly, but computing likelihood requires running the forward algorithm between fixed points, such as utterance boundaries. Thus a direct likelihood criterion is only practical if intermediate fixed points are used, such as the phone boundaries in the SSS method. The likelihood of a split is computed using the forward algorithm over all data samples and states within the fixed boundary times that the split state falls into. The resulting split goodness measure has the advantage that it is a true likelihood, and that it incorporates the effect of a split on neighboring states. A disadvantage is that phone boundaries are required, and typically the prior art SSS method has been used with hand-marked phone boundaries. Viterbi-aligned phone boundaries are likely to work almost as well, but this has not been verified in experiment. However, the real disadvantage of the likelihood splitting criterion is that it is simply too expensive to be used in the SI-SSS method, where it would be called much more often.

Our solution to this problem is to maximize the expected log likelihood, rather than likelihood, taking advantage of the same Expectation-Maximization (EM) algorithm (hereinafter, referred to as EM algorithm) concepts (See a prior art document 13, A. P. Dempster et al., "Maximum Likelihood from Incomplete Data via the EM algorithm", Journal of the Royal Statistical Society, Vol. 37, No. 1, pp. 1–38, 1977) that are behind the standard Baum-Welch training algorithm. The fundamental result behind the EM algorithm means increases in the expected log likelihood of observed data $y_1^T$ and the hidden or unobserved components $S_1^T$. The components are, for example, HMM states.

Let $\theta$ be the vector of parameters that specify the distribution $p(y_1^T, S_1^T)$. The expected log likelihood $Q(\theta|\theta^{(r)})$, where $\theta$ is an independent variable and $\theta^{(r)}$ is the r-th parameter estimation, can be expressed by the following Equation (1):

$$Q(\theta|\theta^{(r)}) = E_{\theta^{(r)}}[\log p(y_1^T, S_1^T | y_1^T, \theta)], \quad (1)$$

where $E_{\theta^{(r)}}[\cdot]$ is an expectation of the log likelihood relative to the parameter $\theta^{(r)}$. Here, at worst, no change is given to the likelihood of the observed data $L(\theta) = \log p(y_1^T|\theta)$.

$$Q(\theta|\theta^{(r)}) \geq Q(\theta^{(r)}|\theta^{(r)}) \rightarrow L(\theta) \geq L(\theta^{(r)}) \quad (2)$$

Because of the conditional independence assumptions in the HMM, the expected log likelihood can be written as the following Equations:

$$Q(\theta|\theta^{(r)}) = E[\log p(y_1^T, s_1^T|\theta)|y_1^T, \theta^{(r)}] \quad (3)$$

$$= \sum_{s_1^T} p(s_1^T|y_1^T, \theta^{(r)}) \log p(y_1^T, s_1^T|\theta)$$

$$= \sum_{s_1^T} p(s_1^T|y_1^T, \theta^{(r)}) \sum_t [\log p(y_t|s_t, \theta_{A(s)}) + \log p(s_t|s_{t-1}, \theta_{B(s)})]$$

$$= \sum_s \sum_t \gamma_t(s) \log p(y_t|s, \theta_{A(s)}) + \sum_{s \cdot s'} \sum_t \xi_t(s, s') \log p(s_t = s|s_{t-1} = s', \theta_{B(s)})$$

where $$\gamma_t(s) = p(s_t = s|y_1^T, \theta^{(r)}) \quad (4), \text{ and}$$

$$\xi_t(s, s') = p(s_t = s, s_{t-1} = s'|y_1^T, \theta^{(r)}) \quad (5).$$

The form of the Equation (3) allows for separate maximization of the distribution parameters $\theta_{A(s)}$ and transition probabilities $\theta_{B(s)}$ for each state $s(\theta = \{\theta_{A(s)}, \theta_{B(s)}\}$ for all s). This allows us to estimate the parameters for a single state (or two states after splitting) so that the expected likelihood is increased, thereby guaranteeing that there is no decrease in likelihood of the observed data.

More specifically, in designing an HMM for state splitting, we maximize $Q(\theta|\theta^{(r)})$ subject to the constraints that $\gamma_t(s)$ and $\xi_t(s, s')$ are fixed for all $s \neq s^*$, where the term "$s^*$" denotes a split state of the state s and the term "s'" denotes a state preceding s (i.e., where $a_{ss'} > 0$). If the initial split is chosen appropriately, as will be discussed later, the constrained function $Q(\theta|\theta^{(r)})$ is guaranteed to be non-decreasing since the terms depending on $s \neq s^*$ do not change and the likelihood due to other terms cannot decrease. Therefore $L(\theta)$ is guaranteed to be non-decreasing. The gain in expected log likelihood for the split from the state $s^*$ to the states $s_0$ and $s_1$ can be determined as follows:

$$G(s^*, s_0, s_1) = \quad (6)$$

$$\sum_{s=s_0, s_1} \left[ \sum_t \gamma_t(s) \log p(y_t|s, \theta_{A(s)}) \right] - \sum_t \gamma_t(s^*) \log p(y_t|s^*, \theta_{A(s^*)}) +$$

$$\sum_{s=s_0, s_1} \left[ \sum_{s'=s_0, s_1} \left[ \sum_t \xi_t(s, s') \log a_{ss'} \right] \right] - \sum_t \xi_t(s^*, s^*) \log a_{s^*s^*},$$

which can be simplified to $$G(s^*, s_0, s_1) = \quad (7)$$

$$\sum_t \left[ \sum_{s=s_0, s_1} \gamma_t(s) \log p(y_t|s, \theta_{A(s)}) - \gamma_t(s^*) \log p(y_t|s^*, \theta_{A(s^*)}) \right] +$$

$$\sum_{s=s_0, s_1} \left[ \sum_{s'=s_0, s_1} N_2(s, s') \log a_{ss'} \right] - N_2(s^*, s^*) \log a_{s^*s^*},$$

where $a_{ss'} = p(s_t = s|s_{t-1} = S', \theta_{B(s)})$, and $$N_1(s) \sum_t \gamma_t(s), \quad (8)$$

and $$N_2(s, s') = \sum_t \xi_t(s, s'). \quad (9)$$

The gain due to the observation distribution 5 parameters alone can be expressed as $$G(s^*, s_0, s_1) = \quad (10)$$

$$\sum_t \left[ \sum_{s=s_0, s_1} \gamma_t(s) \log p(y_t|s, \theta_{A(s)}) - \gamma_t(s^*) \log p(y_t|s^*, \theta_{A(s^*)}) \right] =$$

$$0.5 \sum_{m=1}^M [N_1(s^*) \log \sigma_m^2(s^*) - N_1(s_0) \log \sigma_m^2(s_0) - N_1(s_1) \log \sigma_m^2(s_1)],$$

where $\sigma m^2(s)$ is as given later in Equation (57), assuming that the distribution is described by a diagonal covariance and the subscript m indicates an element of the M-dimensional vector. This particular form of the gain uses the combined mean and covariance likelihood criterion described in the prior art document 10 (based on a result from Chapter 10.3 of a prior art document 14, T. W. Anderson, "An Introduction to Multivariate Statistical Analysis", J. Wiley & Sons, New York, 1984). For contextual splits, where state transition probabilities are held constant, the Equation (10) gives the total expected gain. For temporal splits, on the other hand, the total expected gain can be obtained by the following Equation (11):

$$G_{temporal}(s^*, s_0, s_1) = \quad (11)$$

$$G_o(S) - N_2(s^*, s^*) \log a_{s^*s^*} + N_2(s_0, s_0) \log a_{s_0 s_0} + N_2(s_0, s_1) \log a_{s_1 s_0} +$$

$$N_2(s_1, s_1) \log a_{s_1 s_1} = G_o(S) - N_2(s^*, s^*) \log a_{s^*s^*} + N_2(s_0, s_0) \log a_{s_0 s_0} +$$

$$(N_1(s_0) - N_2(s_0, s_0)) \log(1 - a_{s_0 s_0}) + N_2(s_1, s_1) \log a_{s_1 s_1}.$$

The Equations 10 and 11 give a criterion by which we can compare different candidate splits within and across domains and across states, and choose the split which most increases the expected likelihood of the entire training set. It is to be noted that the Equations (10) and (11) do not give the increase in likelihood per se, but rather the increase in expected likelihood, and so maximizing G(S) over S only guarantees that likelihood is non-decreasing, not necessarily that we have chosen the split that maximally increases likelihood.

Since the Equations (10) and (11) measure increase in the expected joint likelihood of the observations and states, they take a different form than the test used in the prior art SSS method for choosing a splitting domain, which is based on observation likelihood. In addition, the Equations (10) and (11) take a different form from the criterion used in the SSS method for determining the best node to split (See the Equation 1 in the prior art document 1), but in this case the SI-SSS method criterion is preferable. The prior art SSS method criterion is a measure of the distance between the two generic mixture components and not the gain in likelihood relative to having a single state, and it cannot be related to an increase in the likelihood of the training data in any way.

A cost of using the state likelihoods $\gamma_t(s)$ and $\xi_t(s, s')$ in the split HMM design is an increase in the memory requirements. To reduce the memory requirements, we take advantage of a technique used in the prior art SSS method, which is to use phone boundaries (hand-marked or Viterbi aligned) to restrict the set of states that have non-zero probabilities at each time, that is, to reduce the size of $\{\gamma_t(s)\}$.

4. Efficient Search of Contextual Splits

We begin this section by directing attention to the "Additional Observations on the SSS Method" which appears earlier in this disclosure, and by reviewing the Chou two-partitioning algorithm (See the prior art document 17), and then show how the algorithm is applied for the maximum Gaussian log likelihood objective function. We will depart from standard decision tree terminology (and notation), using the term "state" rather than "node" and "HM-net" rather than "tree", in order to make "the application to HMM design" clear. One difference from standard decision tree design, is that observation data may not be assigned to a single node or state, but rather there is a probability distribution describing the likelihood of observation data being in different states. To simplify the initial discussion, we will assume that the observation data are associated with a unique state, which can be obtained with Viterbi alignment (training). Then, we will show how the result can be extended for use in Baum-Welch-style training.

4.1 General Categorical Split Design Algorithm

In this section we summarize the partitioning algorithm of Chou (See the prior art document 17) for splitting a state s using variable X. It is assumed that the values x that would lead to state s form the set $A_s$. We begin by defining L(y, yh) as a loss function that is to be minimized in HM-net (or decision tree) design. The variable yh is a representation of y, which may take on values in the same space as Y (as in quantization, regression or direct classification) or it can be a probability distribution that represents Y (as in the distribution clustering examples described in the prior art).

The impurity of a state s in the HM-net is the minimum possible expected loss in a state given by $$i(s) = E[L(Y\theta(s))|s] \tag{12}$$

where E[f(Y)|s] is a conditional expectation given state s and θ(s) is the "centroid" (center of gravity or center of mass) of s, $$\theta(s) = \underset{yh}{\arg\min}\, E[L(Y, yh)|s]. \tag{13}$$

The divergence d(s, yh) is a difference in expected loss from using yh instead of centroid θ(s) as the representation for state s:

$$d(s, yh) = E[L(Y, yh)|s] - i(s) \tag{14}$$

Upon designing a split for state s, we start with i(s) fixed, and $$i_J(s) = \sum_j p(x_j|s) i(x_j), \tag{15}$$

as the minimum possible impurity (also fixed) which is achieved with a J-ary split, where $x_j$ are the possible values that the contextual factor X can take on. The impurity of a binary split into $s_0$ and $s_1$ is represented by the following Equation (16):

$$i_2(s) = \sum_{k=0,1} p(s_k|s) i(s_k). \tag{16}$$

Let $$i(s) - i_J(s) = [i(s) - i_2(s)] + [i_2(s) - i_J(s)] \tag{17}$$
$$= \Delta_1 + \Delta_2.$$

Since i(s) and $i_J(s)$ are fixed, then their difference is fixed, and maximizing $\Delta_1$, as is traditional in split design with greedy growing, is equivalent to minimizing $\Delta_2$. Chou shows that $$\Delta_2 = \sum_j p(x_j|s) d(x_j, \theta(\alpha(x_j))), \tag{18}$$

which means that minimizing $\Delta_2$ can be interpreted as a quantizer design problem, where the goal is to design the "encoder" $\alpha(x_j)$ and the "decoder" or centroids $\theta(S_K)$ to minimize the expected divergence. It is to be noted that the encoder can be described in terms of the partition $A_K = \{x_j : \alpha(x_j) = S_K\}$ for k=0, 1. A locally optimal solution to this problem can be found using an iterative algorithm analogous to the K-means algorithm, or the Linde-Buzo-Gray algorithm for vector quantization (See a prior art document 18, Y. Linde et al., "An algorithm for vector quantizer design", IEEE Transactions on Communication, Vol. COM-28, pp. 84–95, in January, 1980), that is, iteratively re-estimate the parameters α and θ until convergence (or the relative change in average loss is smaller than some threshold). More explicitly, the two steps are:

(1) For each $x_j$, find a new encoder $\alpha(x_j)^{(r+1)}$:

$$\alpha(x_j)^{(r+1)} = \underset{i}{\arg\min}\, d(x_j, \theta(s_i)^{(r)}), \tag{19}$$

which gives for all k $$A_k^{(r+1)} = \{x_j : \alpha(x_j)^{(r+1)} = k\} \tag{20}.$$

$\arg\min_i$ denotes the argument (out of possible values i) that minimizes the function that argmin operates on.

(2) For k=0, 1, find new decoder $\theta(S_k)^{(r+1)}$:

$$\theta(s_k)^{(r+1)} = \underset{\theta}{\arg\min}\, E[L(Y, \theta)|s_k] \tag{21}$$
$$= \underset{\theta}{\arg\min} \sum_{x_j \in A_k^{(r+1)}} p(x_j|s_k) d(x_j, \theta).$$

For the special case of categorical predictions, Chou's iterative partitioning algorithm is similar to the iterative algorithm proposed by Nadas et al. (See a prior art document 19, A. Nadas et al., "An iterative 'flip-flop' approximation of the most informative split in the construction of decision trees", Proceedings of the International Conference on Acoustic Speech and Signal Processing, pp. 565–568, 1991) with differences in the mechanics of the two steps because of the max $\Delta_1$ vs. min $\Delta$ interpretations.

Chou (See a prior art document 17) shows that this algorithm can be used with a variety of loss functions including, for example, the weighted squared error for regression ($y \in R^M$) and the weighted Gini index and log likelihood for classification ($y^T = [00 \ldots 010 \ldots 0]$ an M-valued class indicator with a one in the m-th row to indicate class M). Here we outline the algorithm specifically for the maximum log likelihood objective function, assuming that distributions are characterized by Gaussians.

4.2 Implementation for Maximum Gaussian Log Likelihood

For the problem of clustering Gaussians, $y \in R^M$ corresponds to a cepstral vector in our speech recognition application. Each element of vector X is a possible split domain (for example, the left context phone label), and X is an element of vector X that takes on a discrete set of J values (for example, the 26 possible Japanese phones). We assume a parametric Gaussian HMM model P(y|s) with a mean $\mu(s)$ and a covariance matrix C(s) A state will then be represented by $\theta(s) = (\mu(s), C(s))$. Now, it is to be recalled that the space of possible values of X corresponding to state s is characterized by $A_s$. The goal is to find the best split of s into $s_0$ and $s_1$ where $A_s = A_0 \cup A_1$.

Referring back to the general algorithm, we need to determine $d(s, \theta)$ and the formula for finding the optimal decoder, based on some specified observations $L(y, \theta)$. If the objective is maximum likelihood, then $L(y, \theta) = -\log p(y|\theta)$. Under this objective function, the Equation 13 becomes the following Equation (22):

$$\theta(s) = \operatorname{argmin}_\theta E[L(Y, \theta)|s] \qquad (22)$$

$$= \operatorname{argmax}_\theta E[\log p(Y|\theta)|s]$$

$$= \operatorname{argmax}_\theta \sum_{t:x_t \in A_s} \log p(y_t|\theta),$$

where $\Sigma$ of "$t: x_t \in A_s$" in the third equation of Equation 22 is a sum computed by varying t, where $x_t$ belongs to $A_s$.

Here we use the empirical distribution since we are training from training data and the true $P(y|s)$ is unknown. It is to be noted that the Equation (22) is the standard maximum likelihood parameter estimate, which gives mean $\mu(s)$ and covariance $C(s)$. Then the divergence represented by Equation 21 becomes the following Equation (23):

$$\begin{aligned} d(s, \theta) &= E[L(Y, \theta)|s] - i(s) \qquad (23) \\ &= -\sum_{t:x_t \in A_s} \log p\left(y_t|\theta + \sum_{t:x_t \in A_s} \log p(y_t|\theta(s))\right) \\ &= \frac{1}{2}\left[ N_s \log|C| + \sum_{t:x_t \in A_s} (y_t - \mu)^t C^{-1}(y_t - \mu) - \right. \\ &\quad \left. N_s \log|C(s)| - \sum_{t:x_t \in A_s} (y_t - \mu(s))^t C(s)^{-1}(y_t - \mu(s)) \right], \end{aligned}$$

where $N_s$ is the number of observations or observation data that map to state s and $\theta = (\mu, C)$. The superscript "t" indicates vector transpose, and $|A|$ represents the determinant of a matrix A.

Binary split design at state s for a single J-valued variable proceeds as follows.

Figure 3:
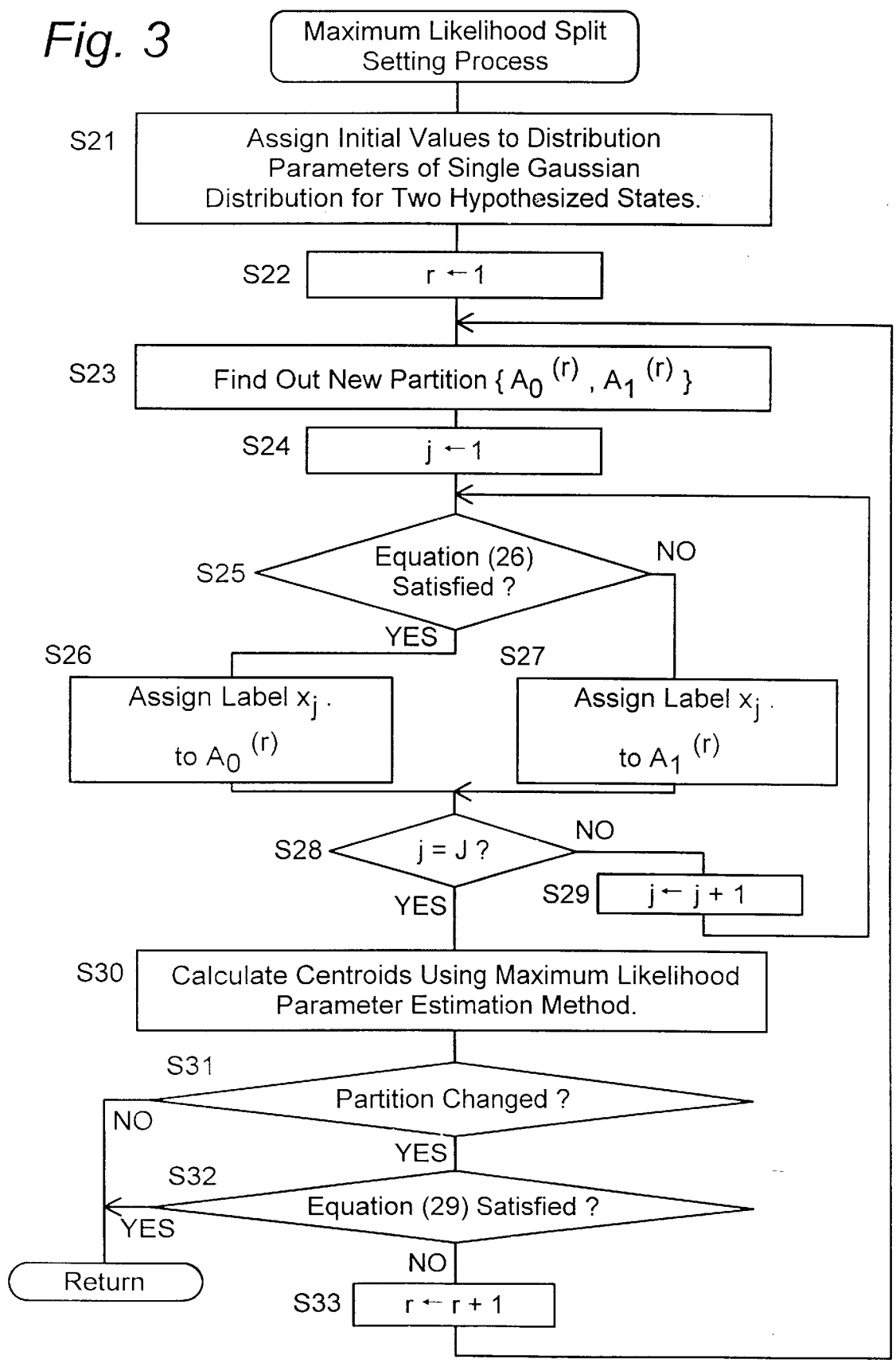
FIG. 3 is a flow chart showing a sub-routine of a maximum likelihood split setting process which is used at step S15 of FIG. 2.

FIG. 3 shows the maximum likelihood split design used at step S15 of FIG. 2. Referring to FIG. 3, first of all, at step S21, initial values are assigned to the distribution parameters of a single Gaussian distribution for the two hypothesized state:

$$\theta^{(0)}(S_0) = \theta(s) = (\mu(s), C(s)) \qquad (24), \text{ and}$$

$$\theta^{(0)}(S_1) = (\mu(s)(1\epsilon), C(s)) \qquad (25).$$

This particular choice ensures that likelihood will increase since one of the states has the original state distribution parameters, analogous to the approach used in vector quantizer design.

Next, a parameter r is set to "one" at step S22, and new partitions $\{A_0^{(r)}, A_1^{(r)}\}$ (which are actually split states) are found at step S23. A parameter j is set to "one" at step S24, and it is decided at step S25 whether or not the following Equation (26) holds:

$$\sum_{t:x_t=x_j} \log p(y_t|\theta^{(r-1)}(s_0)) \geq \sum_{t:x_t=x_j} \log p(y_t|\theta^{(r-1)}(s_1)). \qquad (26)$$

If YES is chosen at step S25, $x_j$ is assigned to partition $A_0^{(r)}$ for each phone label $x_j, = 1, \ldots, J$ at step S26. If NO is chosen, $x_j$ is assigned to partition $A_1^{(r)}$ at step S27. Then, it is decided at step S28 whether or not the parameter j is J. If it is other than J, the parameter j is incremented by 1 at step S29, followed by turning back to step S25, where the same process is iterated. If YES is chosen at step S28, centroids $\{\theta^{(r)}(S_K) = (\mu^{(r)}(S_K), C^{(r)}(S_K)) : K=0, 1\}$ are computed at step S30 using standard maximum likelihood parameter estimation by the following Equation (27):

$$\mu^{(r)}(s_k) = \frac{1}{N_k} \sum_{t:x_t \in A_k^{(r)}} y_t, \qquad (27)$$

and $$C^{(r)}(s_k) = \frac{1}{N_k} \sum_{x_j \in A_k^{(r)}} \sum_{t:x_t = x_j} (y_t - \mu^{(r)}(s_k))(y_t - \mu^{(r)}(s_k))^t, \qquad (28)$$

where $$N_k = \sum_{x_j \in A_k^{(r)}} N_j$$

and, where $N_j$ is the number of elements in $\{t : X_t = X_j\}$, and $N_0 + N_1 = N_s$. Next, at step S31, it is decided whether or not the partition changes, as the first convergence condition. If the partition did not change, the program flow returns to the main routine. If the partition changes, it is decided at step S32 whether or not the following Equation (29) is satisfied, as the second convergence condition:

$$L^{(r)} - \frac{L^{(r-1)}}{|L^{(r-1)}|} < \eta, \qquad (29)$$

where $$L^{(r)} = -N_0 \log|C^{(r)}(S_0)| N_1 \log C^{(r)}(S_1)| \qquad (30),$$

and $\eta$ is a heuristically chosen convergence threshold. It is to be noted that $$L^{(r)} \geq L^{(r-1)} \qquad (31).$$

If the Equation (29) is satisfied at step S32, the program flow returns to the main routine. If it is not satisfied, the parameter p is incremented by 1 at step S33, followed by returning to step S23, where the same process is iterated.

For both the steps in the above-mentioned algorithm, we can save computation by using sufficient statistics to represent the data rather than accumulating log probabilities for every data point. Specifically, we, first of all, compute the cumulative statistics that: describe the data $y_t$ associated with state s for each value $x_j$ that the variable of interest X might take on. Let $N_j$ represent the number of samples (frames) in state s that have $X = x_j$. Define first and second order statistics $$S_j^1(s) = \sum_{t:x_t = x_j, s_t = s} y_t, \qquad (32)$$

and $$S_j^2(s) = \sum_{t:x_t = x_j, s_t = s} y_t y_t^t. \qquad (33)$$

These statistics are computed once for state s in the initialization step and stored in the memory together with counts $N_j$. In the paragraphs below, we show how these statistics can be used in the re-partitioning test using the Equation (27), and parameter re-estimation. We begin by expanding the re-partitioning test using the Equation 26, $$2N_j \log|C(s_0)| + \sum_{t:x_t=x_j} (y_t - \mu(s_0))^t C(s_0)^{-1}(y_t - \mu(s_0)) \leq \quad (34)$$

$$2N_j \log|C(s_1)| + \sum_{t:x_t=x_j} (y_t - \mu(s_1))^t C(s_1)^{-1}(y_t - \mu(s_1)),$$

dropping the superscript (r) indicating iteration number to simplify the notation. The summation terms can be simplified to use the statistics given by the Equations (32) and (33), as follows, $$\sum_{t:x_t=x_j} (y_t - \mu(s_0))^t C(s_0)^{-1}(y_t - \mu(s_0)) = \quad (35)$$

$$\sum_{t:x_t=x_j} tr[(y_t - \mu(s_0))(y_t - \mu(s_0))^t C(s_0)^{-1}] =$$

$$tr\left[ \sum_{t:x_t=x_j} (y_t - \mu(s_0))(y_t - \mu(s_0))^t C(s_0)^{-1} \right] =$$

$$tr\left[ \sum_{t:x_t=x_j} (y_t y_t^t - y_t \mu(s_0)^t - \mu(s_0) y_t^t + \mu(s_0)\mu(s_0)^t) C(s_0)^{-1} \right] =$$

$$tr[(S_j^2 - S_j^1 \mu(s_0)^t - \mu(s_0)(S_j^1)^t + N_j \mu(s_0)\mu(s_0)^t) C(s_0)^{-1}],$$

where we used the identity $z^t A z = tr(zz^t A)$ and the fact that the trace function $tr(\cdot)$ is a linear operator.

Combining these results with the Equation (34), we get the following test:

$$2N_j \log|C(s_0)| + tr[(S_j^2 - 2S_j^1 \mu(s_0)^t + N_j \mu(s_0)\mu(s_0)^t) C(s_0)^{-1}]$$
$$\leq 2N_j \log|C(s_1)| + tr[(S_j^2 - 2S_j^1 \mu(s_1)^t + N_j \mu(s_1)\mu(s_1)^t) C(s_1)^{-1}] \quad (36)$$

The parameter re-estimation equations using the sufficient statistics are the following Equations (37) and (38):

$$\mu(s_k) = \frac{1}{N} \sum_{kx_j \in A_k} \sum_{t:x_t=x_j} y_t = \frac{1}{N} \sum_{kx_j \in A_k} S_j^1(s), \quad (37)$$

and $$C(s_k) = \frac{1}{N} \sum_{kX_j \in A_k} \sum_{t:x_t=x_j} (y_t - \mu(s_k))(y_t - \mu(s_k))^t \quad (38)$$

$$= \frac{1}{N} \sum_{kx_j \in A_k} \sum_{t:x_t=x_j} (y_t y_t^t - y_t \mu(s_k)^t - \mu(s_k) y_t^t + \mu(s_k)\mu(s_k)^t)$$

$$= \frac{1}{N} \sum_{kx_j \in A_k} (S_j^2 - S_j^1 \mu(s_k)^t - \mu(s_k)(S_j^1)^t + N_j \mu(s_k)\mu(s_k)^t).$$

Both the likelihood test and the parameter re-estimation equations are simplified if we assume diagonal covariances. To simplify the cluster likelihood test, it is to be noted that $$\log|C| = \sum_{m=1}^{M} \log \sigma_m^2, \quad (39)$$

and $$tr(C_A C_B^{-1}) \sum_{m=1}^{M} \sigma_{A,m}^2/\sigma_{B,m}^2. \quad (40)$$

Then the new re-partitioning test becomes $$B_0 + \sum_m \frac{S_{j,m}^2(s) - 2S_{j,m}^1(s)\mu_m(s_0) + N_j \mu_m(s_0)^2}{\sigma_m^2(s_0)} \leq \quad (41)$$

$$B_1 + \sum_m \frac{S_{j,m}^2(s) - 2S_{j,m}^1(s)\mu_m(s_1) + N_j \mu_m(s_1)^2}{\sigma_m^2(s_1)}$$

where $$B_k = N_j \log\left( \prod_m \sigma_m^2(s_k) \right) \quad (42)$$

The Equation (38) is also simplified, if covariances are assumed to be diagonal, to $$\sigma_m^2(s_k) = \frac{1}{N} \sum_{kx_j \in A_k} (S_{j,m}^2 - 2S_{j,m}^1 \mu_m(s_k) + N_j \mu_m(s_k)^2), \quad (43)$$

and $$\sigma_m^2(s_k) = \mu_m(s_k)^2 + \frac{1}{N} \sum_{kx_j \in A_k} (S_{j,m}^2 - 2S_{j,m}^1 \mu_m(s_k)) \quad (44)$$

for m=1, . . . , M.

To extend this algorithm to the case where observations are associated probabilistically with states, via the Baum-Welch algorithm rather than via the Viterbi algorithm, one simply weights each term inside the sum of the Equations (32) and (33) by the likelihood that it is in the state that is being updated. Specifically, let $\gamma_t(s)$ correspond to the probability that the state at time t is S. Then,. the new sufficient statistics are:

$$S_j^1(s) = \sum_{t:x_t=x_j} \gamma_t(s) y_t, \quad (45)$$

$$S_j^2(s) = \sum_{t:x_t=x_j} \gamma_t(s) y_t y_t^t, \quad (46)$$

and $$N_j(s) = \sum_{t:x_t=x_j} \gamma_t(s). \quad (47)$$

The $\gamma_t(s)$ terms must be computed using both a forward and backward pass. This information is available from the Baum-Welch iteration in the SSS method and the SI-SSS method, but there is no data structure in the SSS method that saves all of this information and it needs to be added for the SI-SSS method. It is to be noted that the $\gamma_t(s)$ terms are not needed in the SSS method to find either the best node to split or the best split given a node, since the best node to split is chosen from the generic mixture Gaussian distributions and the best split uses the forward algorithm.

5. Constrained HM-net Design of Temporal Splits

In HM-net design, using the greedy search strategy outlined above, our goal is to maximally increase the likelihood of the training data at each step. As shown above, we argued for a constrained EM (expectation-maximum) algorithm approach, where the increase in expected likelihood to the HM-net as a whole is simply the difference in expected likelihood for the split state vs. the two new states. Constraining the forward-backward counts in designing the contextual split is straightforward, since the likelihood of two states in parallel sum to give the likelihood of the original state. However, the likelihood of two states in sequence is not given by a simple sum.

In the SSS method, design of a temporal split involves using the HMM forward algorithm and changing the state likelihoods (t(s), the likelihood that the state is s at time t) of states other than the split state, in which case a larger portion of the network must be evaluated to establish the change in likelihood for the HM-net as a whole. In addition to the extra cost of evaluating a possibly large subnetwork, a problem with allowing the likelihoods of other states to change for the temporal split and not the contextual split is that there will be a bias towards choosing temporal splits.

Figure 5:
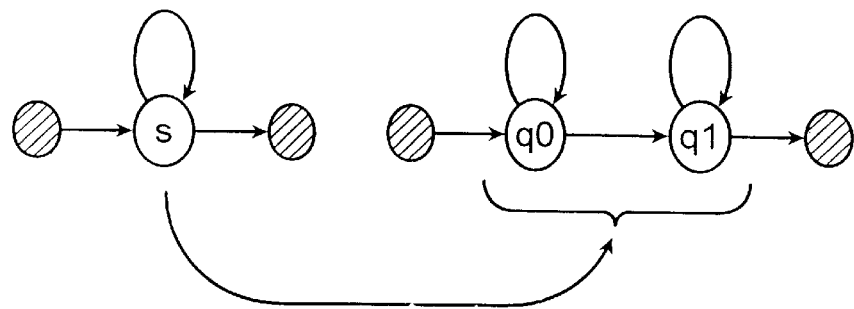
FIG. 5 is a state transition diagram showing a temporal split which is executed by the speaker model generation process of the SI-SSS method of FIG. 2.

The constrained EM criterion addresses both of these problems in the design of temporal splits, with the constraints being that the likelihoods of states other than the split state do not change in the parameter estimation stage of split design. To be more explicit, let s* be the split state and let $q_0$ and $q_1$ be the two states resulting from a temporal split, as illustrated in FIG. 5. We use the notation q for the hypothetical new states and s* for the candidate state to be split, to make the relationship between these more clear. The parameters θ that must be estimated to describe the new state are θ={($\mu(q_0)$, $\sigma(q_0)$, $\nu(q_0)$, $\mu(q_1)$, $\sigma(q_1)$, $\nu(q_1)$)}, where $\mu(q)$ is the mean vector for state q, $\sigma(q)$ is the vector of variances, and $\nu(q)$ is the probability of returning to state q from state q, i.e. the self loop transition probability. In order to insure that only these parameters in the HM-net change and no others do, we require the following constraints:

$$\gamma_t(s^*)=\gamma_t(q_0)+\gamma_t(q_1) \quad (48)$$

$$\xi_t(s^*,s^*)=\xi_t(q_0,q_0)+\xi_t(q_1,q_0)+\xi_t(q_1,q_1) \quad (49)$$

where $$\gamma_t(i)+p(s_t=i|Y) \quad (50), \text{ and}$$

$$\xi_t(i,j)=p(s_t=i,s_{t-31\ 1}=j|Y) \quad (51)$$

are the standard terms needed for HMM re-estimation and Y represents the full training set. These constraints can be easily satisfied by defining $$\gamma h_t(q)=p(q_t=q|s_t=s^*,Y) \quad (52), \text{ and}$$

$$\xi h_t(q,q')=p(q_t=q,q_{t-1}=q'|s_t=s^*,s_{t-1}=s^*,Y) \quad (53)$$

and using the definition of conditional probability and the redundancy of $s_t=s^*$ to get $$\begin{aligned}\gamma_t(q) &= p(q_t=q|Y) \\ &= p(q_t=q,s_t=s^*|Y) \\ &= \gamma h_t(q)\gamma_t(s^*),\end{aligned} \quad (54)$$

and $$\begin{aligned}\xi_t(q,q') &= p(q_t=q,q_{t-1}=q'|Y) \\ &= p(q_t=q,q_{t-1}=q',s_t=s^*,s_{t-1}=s^*|Y) \\ &= \xi h_t(q,q')\xi_t(s^*,s^*).\end{aligned} \quad (55)$$

The terms $\gamma h_t(q)$ and $\xi h_t(q, q')$ can be computed using the standard forward-backward algorithm using only data where $\gamma_t(s^*)>0$ and having non-zero state likelihood only for states $q_0$ and $q_1$ so that $\gamma h_t(q_0)+\gamma h_t(q_1)=1$. To thus constrain the forward-backward algorithm is simply a matter of initializing the forward and backward passes appropriately, or passing a subset of the full data structure as illustrated by the shaded region in FIG. 6.

Figure 6:
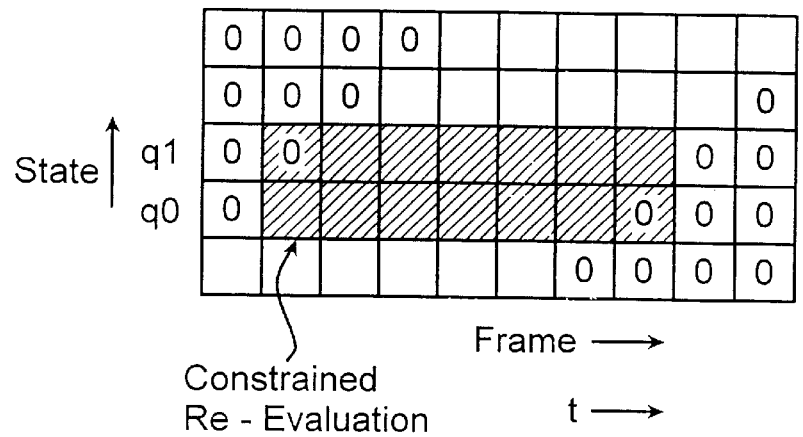
FIG. 6 is a chart showing data and states which are used in computing parameters $\gamma h_t(q)$ and $\xi h_t(q, q')$ by using Equations (52) and (53) for temporal splits which is executed by the speaker model generation process of the SI-SSS method of FIG. 2.

FIG. 6 shows data and states which are used upon computing $\gamma h_t(q)$ and $\xi h_t(q, q')$ for temporal splits, where 0 denotes an impossible state in FIG. 6. Once the terms $\gamma h_t(q)$ and $\xi h_t(q, q')$ are computed, the parameters θ are estimated according to the following Equations:

$$\mu_m(q) = \frac{\sum_t \gamma h_t(q)\gamma_t(s^*)y_{t,m}}{\sum_t \gamma h_t(q)\gamma_t(s^*)}, \quad (56)$$

-continued $$\sigma_m(q) = \frac{\sum_t \gamma h_t(q)\gamma_t(s^*)y_{t,m}^2}{\sum_t \gamma h_t(q)\gamma_t(s^*)} - \mu_m(q)^2, \quad (57)$$

and $$\nu(q) = \frac{\sum_t \xi h_t(q,q)\xi_t(s^*,s^*)}{\sum_{q'}\sum_t \xi h_t(q',q)\xi_t(s^*,s^*)}. \quad (58)$$

where the subscript m indicates the m-th element of the vector.

It is to be noted that the forward-backward algorithm that is used to compute $\gamma h_t(q)$ and $\xi h_t(q, q')$ cannot be used to find the likelihood of the observations that map to the two new states, so relative change in likelihood cannot be used as a stopping criterion for the temporal split retraining. Since the split will later be retrained with the Baum-Welch algorithm, it is reasonable to simply run a fixed number of retraining iterations, and four iterations were used here.

One problem in generation of HMM using a temporal split is that, unlike the contextual split, there is no guarantee of non-decreasing likelihood. Although the SI-SSS method temporal split re-estimation procedure guarantees non-decreasing likelihood because it is a constrained version of the EM algorithm, the split from one to two states cannot be initialized in such a way as to guarantee no decrease in likelihood. A reasonable initial estimate, which is used in this work, is to use the observation distribution of the original state and choose the transition probabilities such that the expected duration of the two hypothesized states together is the same as the expected duration of the original state. In practice, decreases in likelihood, though rare, do sometimes occur, in which case the temporal split for that state would never be chosen. The SSS method temporal splitting algorithm suffers from a similar problem, since it chooses the best temporal split for a fixed set of Gaussians which may not be well-matched to a temporal domain split since they were not designed specifically for that type of split. However, the prior art SSS algorithm may not avoid a bad temporal split, since nodes are split based on distance between mixture components and irrespective of the actual consequence of the split. Of course, the SSS algorithm could potentially achieve a bigger immediate gain than the SI-SSS method temporal split by allowing state re-alignment in split design, however, this difference is probably small because the SI-SSS method allows state re-alignment in the immediately following Baum-Welch re-estimation step. Thus, on balance, we feel that the SI-SSS method temporal split test represents an improvement over the SSS method temporal split test.

6. Speaker-Independent Continuous Speech Recognition Apparatus of Present Preferred Embodiment In the present preferred embodiment, an HMM-net 11 is used as a statistical phone model set for speech recognition. The HMM-net 11 is a phonetic environment dependent model which is expressed efficiently. One HM-net contains a large number of phonetic environment dependent models. The HMM-net 11 is comprised of joint states including Gaussian distributions, where the states are shared among individual phonetic environment dependent models. Therefore, even when the number of data for parameter estimation is insufficient, robust models can be generated. This HMM-net 11 is automatically generated by using an SI-SSS method approach improved from the prior art SSS method. In the SI-SSS method, the processes of deciding the topology of the HMM-net 11, deciding allophone classes, and estimating the parameters of Gaussian distributions for each state are carried out at the same time. In the present preferred embodiment, the parameters of the HMM-net 11 include output probability and transition probability represented by Gaussian distributions. This allows the HMM-net 11 to be treated for recognition as standard HMMs are done. Further, an SSS-LR (left-to-right rightmost type) speaker-independent continuous speech recognition apparatus using the above HMM-net 11 is described below. This speech recognition apparatus uses an efficient HMM expression form of the phonetic environment. dependent type, which is called an HMM-net 11 stored in the memory.

Referring to FIG. 1, spoken speech of a spoken speech sentence of a speaker is inputted to a microphone 1, being converted into a speech signal, which is then inputted to a feature extractor 2. The feature extractor 2 converts the input speech signal from analog to digital form, and then executes, for example, an LPC analysis so as to extract 34-dimensional feature parameters including log power, 16-dimensional cepstrum coefficients, delta log power, and 16-dimensional delta cepstrum coefficients. The time series of the extracted feature parameters are inputted to a phoneme checker 4 via a buffer memory 3.

The HMM-net 11 connected to the phoneme checker 4 is represented as a plurality of networks having the states as nodes. Each state has the following information:

(a) State number;
(b) Acceptable context class;
(c) List of antecedent states and succeeding states;
(d) Parameters of output probability density distribution; and
(e) Self-transition probability and succeeding-state transition probability.

The phoneme checker 4 executes a phoneme check or comparison process on a phoneme check request from the phoneme-context-dependent type LR parser 5. Then, the likelihood for data within a phoneme check interval is computed using a speaker-independent model, and the resulting value of likelihood is returned to the LR parser 5 as a phoneme check score. The model used for this process is equivalent to the HMM, and therefore, the forward pass algorithm used for standard HMMs is used as it is for the computation of likelihood.

On the other hand, a specified context-free grammar (CFG) within a context-free grammar database 20 is automatically converted as well known to generate an LR table 13, which is stored in a memory for the LR table 13. With reference to the LR table 13, the LR parser 5 processes the input phoneme prediction data from left to right without turn-back. If there is some ambiguity in terms of syntax, the stack is split so that all the candidate analyses are processed in parallel. The LR parser 5 predicts the next incoming phoneme from the LR table 13 to output phoneme prediction data to the phoneme checker 4. In response to this, the phoneme checker 4 makes a check or comparison with reference to the information within the HMM-net 11 corresponding to the incoming phoneme, and returns its likelihood to the LR parser 5 as a speech recognition score, thus making the phonemes adjoined one after another. In this way, the phoneme checker 4 performs the continuous speech recognition, and outputs speech recognition result data thereof. In this continuous speech recognition, if a plurality of phonemes are predicted, all these phonemes are checked for their presence, followed by a branch cut that partial trees with higher likelihoods of partial speech recognition are left by the beam search method, so that fast processing is realized.

In the preferred embodiment as shown above, the feature extractor 2, the phoneme checker 4, the LR parser 5, and the speaker-independent model generator 31 are implemented by, for example, a digital computer. Also, the memories and the buffer memory 3 for storing the spoken speech data 30 of specific speakers, the HMM-net 11, the context-free grammar database 20, and the LR table 13 are implemented by, for example, hard disk memories.

7. Experiments

In the present preferred embodiment, we describe two series of experiments that represent preliminary work in establishing the effectiveness of the SI-SSS method of the present preferred embodiment. After describing the corpora used in the experiments, we present experimental results for speaker-dependent speech recognition on real speech. This experiment represents the most difficult test for the SI-SSS method, because it is the paradigm that the SSS method was developed under and because the very controlled nature of the corpus does not present the type of problems that the SI-SSS method is aimed at solving. Next, we describe experiments on a multi-speaker task, as a preliminary step demonstrating gains in a task closer to our goal of speaker-independent speech recognition.

7.1 Paradigm

The goal of the present invention is to develop better speaker-independent HMM models for spontaneous speech, to obtain the best possible performance from the operation of the speaker-independent. speech recognition apparatus as well as to provide a better starting point for speaker adaptation.

Several corpora were used in these experiments. A Japanese corpus of isolated read words consisting of the most frequent 5240 words (A-set) is used for the speaker-dependent experiments (6 speakers). All sentences in the read speech corpora are hand-transcribed with a phoneme label sequence, and start and end points for each speech segment, which facilitates SSS method training. The speech was recorded from professional speakers under low noise conditions. The A-set and C-set corpora are described in a prior art document 20, A. Kurematsu et al., "ATR Japanese speech database as a tool of speech recognition and synthesis", Speech Communication, 9: 357–363, 1990.

The analysis parameters consisted of sampling rate of 12000 Hz, frame shift of 5 msec., frame length of 20 msec., pre-emphasis of 0.98, LPC analysis with order 16 and calculation of 16 cepstral, 16 delta cepstral, power and delta power values. The length of the triangular regression window for the delta cepstral calculation was 9 frames on either side, i.e. a two-sided window of 90 msec. Recognition experiments were performed using a one-pass Viterbi algorithm with the phonotactic constraints of Japanese language expressed as phoneme-pair grammar (See a prior art document 21, H. Singer et al., "Speech recognition without grammar or vocabulary constraints", Proceedings of International Conference on Spoken Language Processing, pp. 2207–2210, 1994).

7.2 Speaker-Dependent HM-Net Experiments

Figure 7:
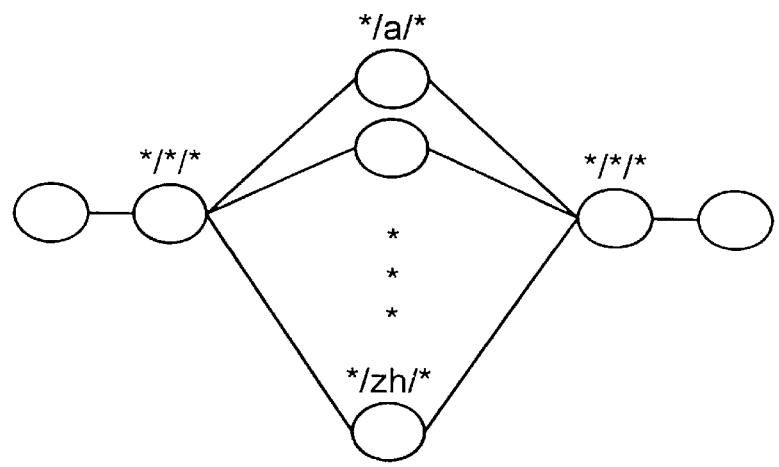
FIG. 7 is a state transition diagram showing initial HM-net topologies for speaker-dependent experiments.

In order to verify that the SI-SSS algorithm always performs at least as well as the SSS algorithm, we conducted initial experiments in speaker-dependent mode 200 and 400 state single Gaussian models and a 3-mixture 400 state model were trained on the even-number words of the A-set for each speaker (2620 words). The initial topology used twenty-seven states, one center state for each of the 25 phones and a single left and right state shared by all phones, as shown in FIG. 7, to reduce the initial HM-net training time and guarantee that each phone is identifiable. These plural models were tested on 1310 of the odd-numbered words. After designing the HM-net topology, a maximum of twenty-one iterations of Baum-Welch re-iteration were run to estimate single Gaussian state observation distributions. For the single Gaussian models, usually fewer than ten iterations were required, using a threshold test on the relative likelihood gain. The results are summarized in Table 1:

TABLE 1

| | % Accuracy | | | | | |
|---|---|---|---|---|---|---|
| | 200 states 1 Gaussian /State | | 400 states 1 Gaussian /State | | 400 states 3 Gaussians /State | |
| Speaker | SSS | SI-SSS | SSS | SI-SSS | SSS | SI-SSS |
| MHT | 93.9 | 92.8 | 95.4 | 94.5 | 96.1 | 96.0 |
| MAU | 93.6 | 93.2 | 95.2 | 95.2 | 96.4 | 96.7 |
| MXM | 91.7 | 91.9 | 93.6 | 93.9 | 95.3 | 95.1 |
| FTK | 91.5 | 91.1 | 92.9 | 94.0 | 94.7 | 95.0 |
| FMS | 89.7 | 91.3 | 91.9 | 93.2 | 94.2 | 94.6 |
| FYM | 90.7 | 92.4 | 92.9 | 93.6 | 95.1 | 95.5 |
| Average | 91.9 | 92.1 | 93.7 | 94.1 | 95.3 | 95.5 |

As apparent from Table 1, on the average and in almost all the cases, results for the SI-SSS method of the present preferred embodiment are slightly better than for the SSS method of the prior art example. The one exception is the speaker MHT, which was used in much of the SSS method development work. Differences are not significant as expected since the main variability in state distributions for this speaker-dependent data is contextual, in particular because the speakers are professional and the recordings are high quality.

In addition, we noticed that the SI-SSS method of the present preferred embodiment distributes (or classifies) multiple allophones across more phones than does the prior art SSS method, in particular for the 200-state topology. The SI-SSS method results in more allophones for the consonants than those of the SSS method, as well as a somewhat more uniform distribution of allophones over the vowels. The distribution differences are particularly striking for /a/ vs. /u/, where the SSS method generates many more allophones for /a/ than for /u/ and the SI-SSS method has similar numbers for the 400 state model and more allophones for /u/ in the 200 state model.

The computation time for the SSS method and the SI-SSS method was measured for each successive split. Computation time for the SI-SSS method is significantly less than for the SSS method, in particular after all possible temporal splits have been chosen since temporal splits are more costly for the SI-SSS method. The number of temporal splits is limited here, since the maximum number of states in sequence is limited to four which effectively establishes a minimum phone duration constraint of 20 msec.

Figure 8:
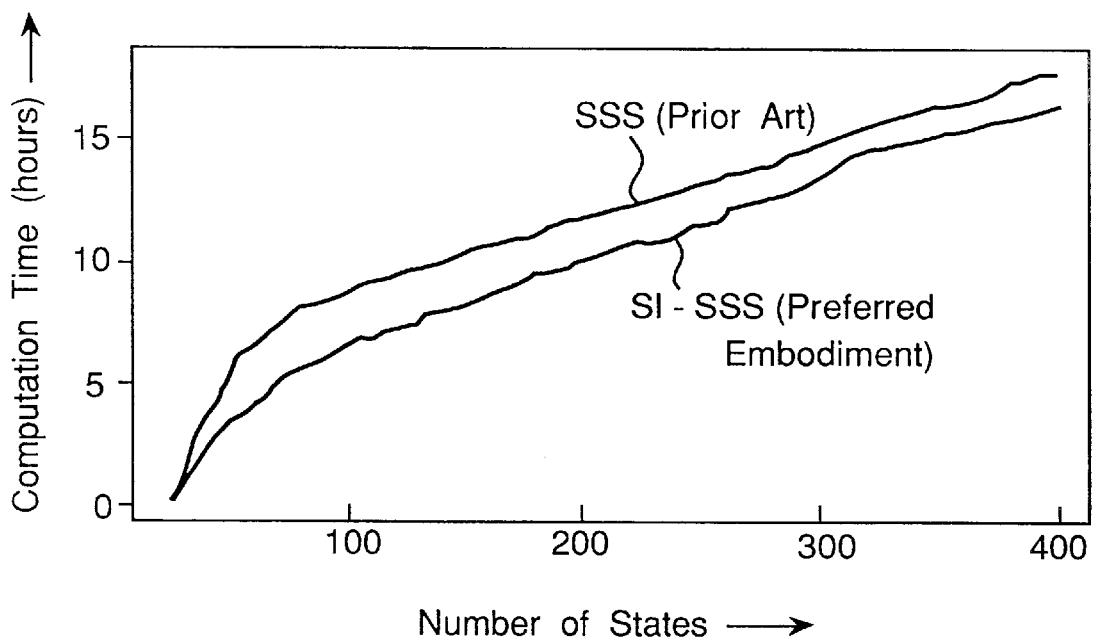
FIG. 8 is a graph showing a comparison of CPU computation time between the speaker model generation process of the SI-SSS method of FIG. 2 and the speaker model generation process of the SSS method of FIG. 13.

FIG. 8 illustrates a difference in computation costs for speaker FTK. On the other hand, the SI-SSS method of the present preferred embodiment requires more memory than the SSS method because the Baum-Welch state likelihoods must be stored for use in split design. For the 2620 word training set size, the difference in cost is roughly 80 MBytes vs. 50 MBytes. We estimate that speaker-independent training with 10 speakers and 1000 words per speaker could be run using a 100 MBytes main memory.

7.3 Multi-Speaker HM-Net Experiments

Next we conducted a multi-speaker speech recognition experiment using the continuous speech recognition apparatus of FIG. 1, comparing the prior art SSS method and the SI-SSS method of the present preferred embodiment. From each of the six speakers MAU, MHT, MXM, FYM, FMS and FTK we selected randomly 500 words from the even numbered words of the 5240 word database (for the database, See a prior art document 20). The selected data gives a total of 3000 words, which is about the same number as has been used for each of the speaker-dependent experiments. Clearly, more training data is needed for a multi-speaker or speaker-dependent model, but the experiment was conceived mainly for debugging purposes. The same HM-net design procedures were used as in the speaker-dependent experiment, that is, models were retrained with a single Gaussian (one mixture) for 200 states, and one and three mixtures for 400 states. For speech recognition we tested in multi-speaker mode, using 100 randomly selected words from each of the above 6 speakers.

Figure 9:
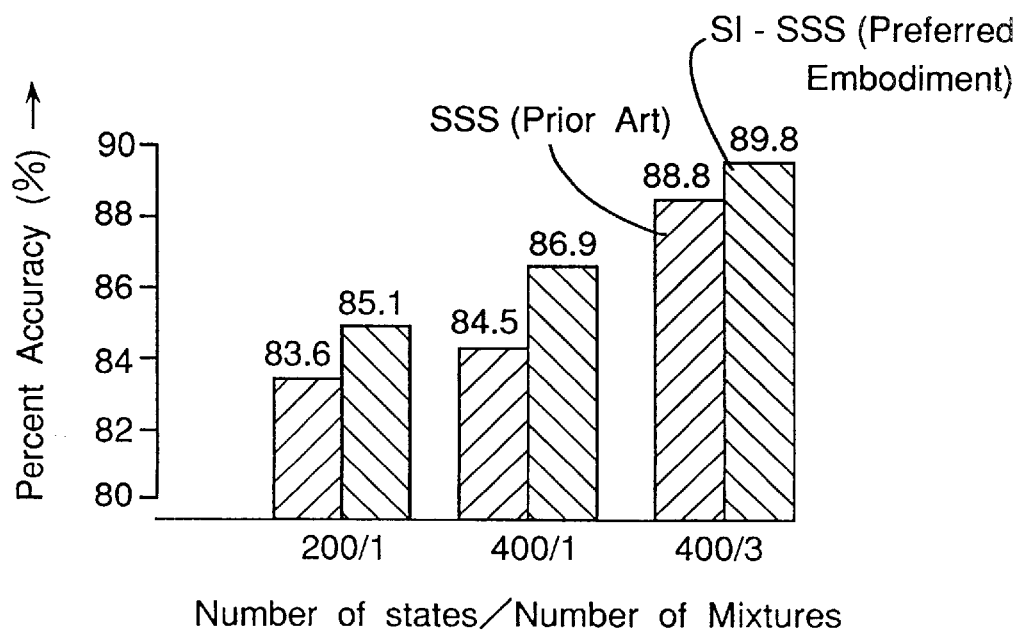
FIG. 9 is a graph showing phoneme recognition rates of the speaker model generation process of the SI-SSS method of FIG. 2 and the speaker model generation process of the SSS method of FIG. 13 on a plurality of speaker recognition tasks, with the use of the speech recognition apparatus of FIG. 1.
Figure 10:
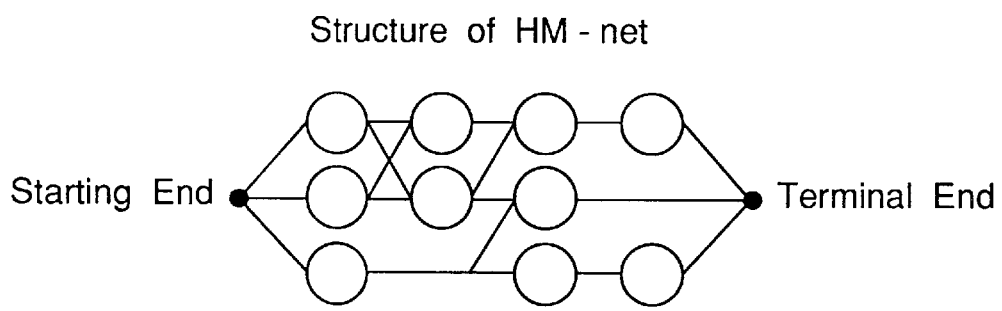
FIG. 10 is a state transition diagram showing an HM-net structure of a prior art example.
Figure 11:
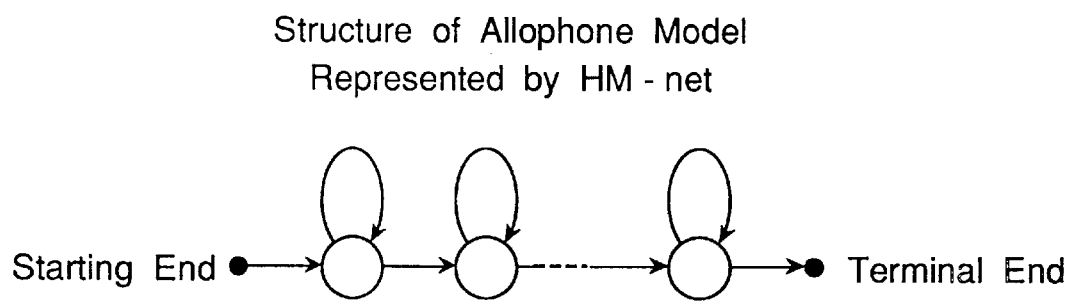
FIG. 11 is a state transition diagram showing each allophone model structure represented by an HM-net of the prior art example.

The results are shown in FIG. 9. As apparent from FIG. 9, the SI-SSS method of the present preferred embodiment consistently performs better than the prior art SSS method, the difference being greatest for the higher context resolution model (400 states) using a single mixture (1 mixture) Gaussian distribution. Using three mixtures the difference is smaller, which is not surprising since the lack of allophones can be compensated for by the introduction of a plurality of mixtures.

In the above-mentioned preferred embodiment, the name of the SI-SSS method is used. However, the name of the method of the preferred embodiment can be changed from the SI-SSS method to an ML-SSS (Maximum Likelihood Successive State Splitting), because the major difference to be prior art SSS method is the maximum likelihood split criterion. Furthermore, speaker independent (SI) training is only one possible application : in principle, the ML-SSS method can deal with any clustering task even when the variability in the data is due to factors that are not expressed in the labels. One particular example of this is the SI training, where much of the variability is due to speaker characteristics. The prior art SSS method failed in these tasks and required that the major source of variability was represented in the labels, typically the preceding, center, and succeeding phoneme contexts.

As described in detail above, according to the present preferred embodiments of the present invention, there is provided a speaker-independent model generation apparatus comprising:

model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution.

Therefore, the computation time for training can be reduced, as compared with the prior art counterpart.

In the above-mentioned speaker-independent model generation apparatus, said model generation means preferably comprises:

initial model generation means for generating an initial hidden Markov model of a single Gaussian distribution using the Baum-Welch training algorithm based on spoken speech data from a plurality of specific speakers;

search means for searching a state having a maximum increase in likelihood upon splitting one state in contextual or temporal domains on the initial hidden Markov model of the single Gaussian distribution generated by said initial model generation means;

generation means for splitting the state having the maximum increase in likelihood searched by said search means, in a contextual or temporal domain corresponding to the maximum increase in likelihood and thereafter for generating a hidden Markov model of a single Gaussian distribution using the Baum-Welch training algorithm; and control means for generating a speaker-independent hidden Markov model by iterating a process of said search means and a process of said generation means until at least one of the following conditions is satisfied:
(a) the states within the hidden Markov model of the single Gaussian distribution can no longer be split; and
(b) a number of states within the hidden Markov model of the single Gaussian distribution reaches a predetermined number of splits.

Therefore, the computation time for training can be reduced, as compared with the prior art counterpart.

In the above-mentioned speaker-independent model generation apparatus, the states searched by the search means are preferably limited to two new states split by said generation means in the preceding process. As a result, the computation time of the processing unit can be reduced as compared with the above-mentioned model generation apparatuses.

In the above-mentioned speaker-independent model generation apparatus, the states searched by the search means are preferably limited to two new states split by said generation means in the preceding step and a state which is away from the two new states by a distance of one. As a result, the computation time of the processing unit can be reduced as compared with the above-mentioned model generation apparatuses.

According to another aspect of the present invention, there is provided a speech recognition apparatus comprising:
model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution; and speech recognition means for, in response to an input speech signal of a spoken speech, recognizing the spoken speech with reference to the speaker-independent hidden Markov model generated by said model generation means.

Therefore, the speech recognition apparatus can perform speech recognition with reference to the generated speaker-independent models. Thus, there can be provided a speech recognition apparatus capable of improving the speech recognition rate, as compared with the prior art counterpart.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A speaker-independent model generation apparatus comprising:
model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution.

2. The speaker-independent model generation apparatus as claimed in claim 1, wherein said model generation means comprises:
initial model generation means for generating an initial hidden Markov model of a single Gaussian distribution using the Baum-Welch training algorithm based on spoken speech data from a plurality of specific speakers;

search means for searching a state having a maximum increase in likelihood upon splitting one state in contextual or temporal domains on the initial hidden Markov model of the single Gaussian distribution generated by said initial model generation means;

generation means for splitting the state having the maximum increase in likelihood searched by said search means, in a contextual or temporal domain corresponding to the maximum increase in likelihood and thereafter for generating a hidden Markov model of a single Gaussian distribution using the Baum-Welch training algorithm; and control means for generating a speaker-independent hidden Markov model by iterating a process of said search means and a process of said generation means until at least one of the following conditions is satisfied:
(a) the states within the hidden Markov model of the single Gaussian distribution can no longer be split; and
(b) a number of states within the hidden Markov model of the single Gaussian distribution reaches a predetermined number of splits.

3. The speaker-independent model generation apparatus as claimed in claim 2, wherein the states searched by the search means are limited to two new states split by said generation means in the preceding process.

4. The speaker-independent model generation apparatus as claimed in claim 2, wherein the states searched by the search means are limited to two new states split by said generation means in the preceding step and a state which is away from the two new states by a distance of one.

5. A speech recognition apparatus comprising:
model generation means for generating a hidden Markov model of a single Gaussian distribution using a Baum-Welch training algorithm based on spoken speech data from a plurality of specific speakers, and thereafter for generating a speaker-independent hidden Markov model by iterations of splitting a state having a maximum increase in likelihood upon splitting one state in contextual or temporal domains on the hidden Markov model of the single Gaussian distribution; and speech recognition means for, in response to an input speech signal of a spoken speech, recognizing the spoken speech with reference to the speaker-independent hidden Markov model generated by said model generation means.

6. A speech recognition apparatus comprising:

initial model generation means for generating a hidden Markov model of a single Gaussian distribution using the Baum-Welch training algorithm based on spoken speech data from a plurality of specific speakers;

search means for searching a state having a maximum increase in likelihood upon splitting one state in contextual or temporal domains on the hidden Markov model of the single Gaussian distribution generated by said initial model generation means;

generation means for splitting the state having the maximum increase in likelihood searched by said search means, in a contextual or temporal domain corresponding to the maximum increase in likelihood and thereafter for generating a hidden Markov model of a single Gaussian distribution using the Baum-Welch training algorithm;

control means for generating a speaker-independent hidden Markov model by iterating a process of said search means and a process of said generation means until at least one of the following conditions is satisfied:

(a) the states within the hidden Markov model of the single Gaussian distribution can no longer be split; and (b) a number of states within the hidden Markov model of the single Gaussian distribution reaches a predetermined number of splits; and speech recognition means for, in response to an input speech signal of a spoken speech, recognizing the spoken speech with reference to the speaker-independent hidden Markov model generated by said control means.

7. The speech recognition apparatus as claimed in claim 6, wherein the states searched by the search means are limited to two new states split by said generation means in the preceding process.

8. The speech recognition apparatus as claimed in claim 6, wherein the states searched by the search means are limited to two new states split by said generation means in the preceding step and a state which is away from the two new states by a distance of one.

9. A method for generating a speaker-independent model, including the following steps:

generating a hidden Markov model of a single Gaussian distribution using a Baum-Welch training algorithm based on spoken speech data from a plurality of specific speakers; and thereafter, generating a speaker-independent hidden Markov model by iterations of splitting a state having a maximum increase in likelihood upon splitting cone state in contextual or temporal domains on the hidden Markov model of the single Gaussian distribution.

10. A method for generating a speaker-independent model, including the following steps:

generating an initial hidden Markov model of a single Gaussian distribution using the Baum-Welch training algorithm based on spoken speech data from a plurality of specific speakers;

searching a state having a maximum increase in likelihood upon splitting one state in contextual or temporal domains on the generated initial hidden Markov model of the single Gaussian distribution;

splitting the searched state having the maximum increase in likelihood, in a contextual or temporal domain corresponding to the maximum increase in likelihood, and thereafter, generating a hidden Markov model of a single Gaussian distribution using the Baum-Welch training algorithm; and generating a speaker-independent hidden Markov model by iterating said searching step and said splitting and generating step until at least one of the following conditions is satisfied:

(a) the states within the hidden Markov model of the single Gaussian distribution can no longer be split; and (b) a number of states within the hidden Markov model of the single Gaussian distribution reaches a predetermined number of splits.

* * * * *